United States Patent [19]

Rossides

[11] Patent Number: 5,620,182
[45] Date of Patent: Apr. 15, 1997

[54] EXPECTED VALUE PAYMENT METHOD AND SYSTEM FOR REDUCING THE EXPECTED PER UNIT COSTS OF PAYING AND/OR RECEIVING A GIVEN AMMOUNT OF A COMMODITY

[76] Inventor: Michael T. Rossides, 3666 Upton St., NW., Washington, D.C. 20008

[21] Appl. No.: 165,676

[22] Filed: Dec. 13, 1993

Related U.S. Application Data

[63] Continuation-in-part of Ser. No. 804,479, Dec. 13, 1991, Pat. No. 5,269,521, which is a continuation-in-part of Ser. No. 609,063, Nov. 7, 1990, Pat. No. 5,085,435, which is a continuation-in-part of Ser. No. 571,126, Aug. 22, 1990, abandoned.

[51] Int. Cl.$^6$ .............................. A63F 9/00; G06F 17/60
[52] U.S. Cl. .................. 273/138.2; 463/25; 364/412; 395/214; 395/216
[58] Field of Search ...................... 273/138 A, 138 R, 273/460, 138.2; 364/412, 405; 194/211, 219, 230, 292; 463/25

[56] References Cited

U.S. PATENT DOCUMENTS

| | | | |
|---|---|---|---|
| 3,770,269 | 11/1973 | Elder | 273/138 A |
| 3,852,576 | 12/1974 | Rudd | 273/138 A |
| 4,206,920 | 6/1980 | Weatherford | 373/138 A |
| 4,815,741 | 3/1989 | Small | 273/138 A |
| 4,859,590 | 8/1989 | Jolliff | 273/138 A |
| 4,948,134 | 8/1990 | Suttle et al. | 273/274 |
| 5,085,435 | 2/1992 | Rossides | 273/138 A |
| 5,269,521 | 12/1993 | Rossides | 273/138 A |

FOREIGN PATENT DOCUMENTS

| | | | |
|---|---|---|---|
| 2123702 | 2/1984 | United Kingdom | 273/138 A |

*Primary Examiner*—Benjamin H. Layno

[57] ABSTRACT

Disclosed is an Expected Value Payment Method for the purpose of reducing the expected per unit costs incurred in paying and/or receiving a given amount of a commodity. An Expected Value Payment Method uses a random number supplier to decide bets that can reduce expected per unit costs in two ways. First, expected per unit costs can be reduced for the payer and/or receiver of a commodity by giving the receiver a chance to win a greater amount of the commodity than a given amount, the greater amount having a lower per unit cost than the given amount which was originally to be paid and received. Second, a probabalistic sorting method and system is disclosed allowing businesses to offer customers who bet to win a given amount of a commodity a better expected price for that amount than the price offered to customers paying conventionally. Also disclosed are Expected Value Payment Execution Methods and Systems that make an Expected Value Payment Method practical in the marketplace and methods and systems for preventing cheating in expected value payment bets.

2 Claims, 15 Drawing Sheets

```
NAME

PAY TO_____  —29.5

┌─────────┐   CHECK NO.  666 666 666
│         │
└─────────┘                _____
LOTTO CHECK
EP VALUE $100
                      29.6
```

Figure 9

EXPECTED VALUE PAYMENT METHOD AND SYSTEM FOR REDUCING THE EXPECTED PER UNIT COSTS OF PAYING AND/OR RECEIVING A GIVEN AMMOUNT OF A COMMODITY

This application is a continuation in part of application Ser. No. 07/804,479, filed Dec. 13, 1991, now U.S. Pat. No. 5,269,521, which is a continuation-in-part of application Ser. No. 07/609,063, filed Nov. 7, 1990, now U.S. Pat. No. 5,085,435, which is a continuation-in-part of application Ser. No. 571,126, filed Aug. 22, 1990, now abandoned.

FIELD OF THE INVENTION

This invention relates to a new payment method and also to methods and systems that can make that method practical in the marketplace.

SUMMARY OF THE INVENTION

The object of the invention is to make practical an Expected Value Payment Method for reducing the expected per unit costs of paying and/or receiving a given amount of a commodity. An Expected Value Payment Method and System requires a Random Number Supplier (RNS) or the equivalent. Furthermore, it requires, in most cases, means and methods that prevent cheating in expected value payment bets. The invention thus includes those means and methods.

FIGURES

FIG. 9 shows a lottery ticket check.

DESCRIPTION

Table of Contents

Figure 1:
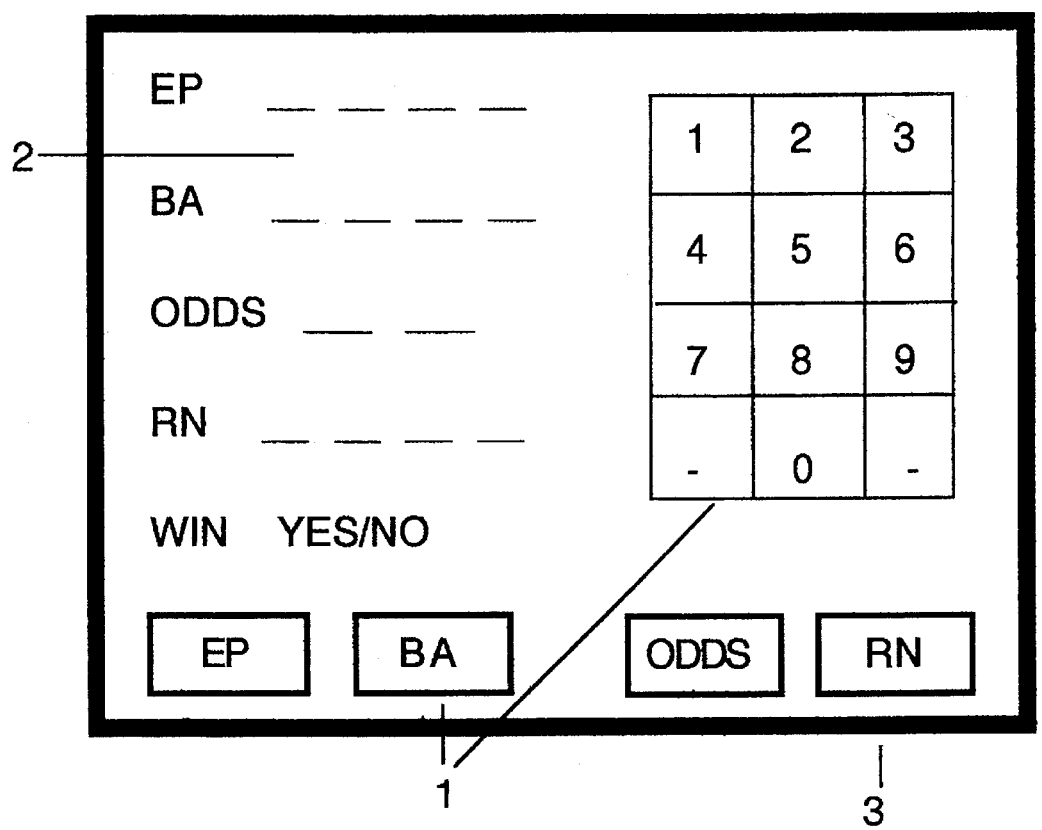
FIG. 1 shows a prototypical Expected Value Payment Execution System (EVPES).

Expected Value Payment Method Explained
Expected Value Payment Method Applications
Expected Value Payment Execution Methods and Systems
Introduction to Methods and Systems For Preventing Cheating
Inspections
Combined Inputs
Verifiably Independently Determined Random Numbers
Expected Value Payment Method When Transferring Risk
Expected Value Payment Methods For Speeding Up Lines
Blum's Protocol
New Material, Various Subjects
Note on Terminology In this application "embodiment" will be taken in its most general sense. Many embodiments will be described in this application. It is not fair to call one embodiment preferred because of the wide variety of situations where the invention can apply. There will be many specific illustrations of embodiments and these will be called "illustrations". They too are not intended to limit the scope of the inventor's claims in any way.

"Commodity" and "Payment" Defined

In this application "commodity" does not refer to all commodities but instead to those that are quantifiable and can be used as payment. Quantifiable services are included in the term. "Use as payment" means one party gives another party ownership of a commodity or rights to use a commodity.

Clearly, "payment" here does not refer just to the obvious case of payment with money because money is by no means the only commodity used as payment. The general concept of payment is seen in barter where both commodities in an exchange are payment. Money is an invention that has taken the place of one of the sides in a barter exchange. For example, if one buys a mug at a store, one pays the store say, $5.13, and the store pays one the mug. The mug is payment for the $5.13. Of course a payment does not have to be part of an exchange. One may make a payment and get nothing quantifiable in return, for example, when one pays taxes or gives a gift.

"Costs of Paying and/or Receiving a Commodity" Defined

In this application, the term "the costs of paying and/or receiving a commodity" is a very inclusive term which refers to the great variety of costs that can be incurred when a commodity is used as payment. The term is broad because costs vary greatly with the commodity and situation and differ for the Payer and the Receiver.

The most obvious cost is for the Receiver of a commodity when that commodity is bought by the Receiver. The obvious cost then for the Receiver is the amount of money it takes to buy the commodity (this cost is the only cost that the Receiver pays to the Payer). Other costs for the Receiver can be time costs. For example, when a store is receiving money, the store clerk requires time to handle the money. Information costs are another type of Receiver cost, for example, a party receiving stock might record that fact.

(A Receiver can pay for a commodity with a commodity other than money. This case is a barter exchange. Yet, in this application, for simplicity's sake, we will assume in exchanges that money is the second side of an exchange.)

The Payer's costs in this application DO NOT refer to the Payer's total costs tied up in a commodity. They do not, for example, refer to production costs. They refer only to the costs that are incurred in the paying of a commodity. To name a few, these costs can include the time spent making the payment, the overhead assigned to the payment and the costs of recording the payment.

Many costs of paying and receiving a commodity are hidden. For example, a stockholder receives money in the form of a dividend check. He or she does not see the cost the Payer incurred in writing the check.

"Per Unit Cost" (PUC) Defined

The per unit cost (PUC) of paying a given amount of a commodity is: the cost of paying the amount divided by the number of units in the amount. Likewise, the PUC of receiving a given amount of a commodity is: the cost of receiving the amount divided by the number of units in the amount. The trick is to decide what these costs include. There is no formula. For example, a person might receive 5 pens costing $10. The PUC of these pens is then $2. On the other hand, the Receiver can factor in other costs such as time costs, transportation costs, and opportunity costs. This would make the cost of receiving the 5 pens:

($10+time cost+transportation cost+opportunity cost)/5.

"Expected Value Payment Method" (EVPM) Defined

An Expected Value Payment Method (EVPM) is a method of payment whereby the Payer and Receiver of a commodity enter into a bet such that the Receiver may or may not receive the commodity depending on whether the Receiver wins the bet or not.

(This definition includes bets where a receiver can lose and still receive something. For example, if Bob makes a bet such that if he or wins he gets 15 pens and if he loses he gets 5 pens, the bet is really for 0 or 10 pens with 5being definitely received.)

Three values determine a bet:
WHAT CAN BE WON,
THE CHANCE OF WINNING,
THE COST PAID FOR HAVING THE CHANCE OF WINNING.

The average amount one will win, if one repeats a bet an infinite number of times, is called the Expected Value (EV) of the bet. It is calculated by multiplying WHAT CAN BE WON by THE CHANCE OF WINNING.

In an EVPM, the EV is set precisely.

And, in an EVPM, the bet is decided by a Random Number Supplier or the equivalent.

Scope of an EVPM

An EVPM can apply to payment situations where the commodity being paid is quantifiable and where the payment does not have to be made. For example, a bet can be made as to whether a person receives change back on a purchase or not but a bet cannot be made as to whether a person receives medicine or not.

An Expected Value Payment Method Used to
Reduce The Expected Per Unit Costs (EPUC's) of
Paying and/or Receiving a Given Amount of a
Commodity There are two ways that an EVPM can reduce expected per unit costs. The more general way will be described first.

An Expected Value Payment Method Used to
Reduce The Expected Per Unit Costs of Paying
and/or Receiving a Given Amount of a Commodity
By Giving the Receiver a Chance to Win a Greater
Amount of the Commodity Having a More
Favorable Per Unit Cost Than The Given Amount
Which the Receiver Was Originally to Receive The per unit costs of paying and/or receiving a commodity vary with the amount of the commodity paid and received. The PUC's of a commodity are not always less as the amount of the commodity goes up (there is no general formula for PUC's of commodities). Still, with an EVPM we can take advantage of the fact that the PUC's of a commodity often are less at certain greater amounts than a given amount. The examples below demonstrate.

Items Bought In Wholesale vs. Retail Amounts

If a person buys, say, 5 pens at a time, the cost will usually be more per pen than if he or she buys 1000 pens at a time.

Money Paid by Many Small Checks vs. One Big Check

A company can pay a person $10 by sending that person ten $1 checks. However, it is cheaper per dollar (for both parties) to pay with one $10 check because there are costs involved in writing, cashing, recording and processing checks.

Stocks Bought in Odd Lots vs. 100 Share Lots

Stocks which are traded in amounts of less than 100 shares are called odd lots. Traders usually charge a premium to trade odd lots so it is cheaper, per unit of stock, to trade in even lots.

Money Paid by Coins (in the U.S.) vs. Bills

The costs for both customer and stores of handling coins are mainly time costs. It is less costly, per unit of currency, for both parties if cash purchases involve only bills.

The Goal of an EVPM

Assume one party is originally supposed to pay another party a given amount of a commodity. Call the two parties the Payer and the Receiver. Further call the given amount the Original Amount (OA). There is a certain PUC at the OA for both the Payer and Receiver.

Also assume the PUC is lower, for one or both of the parties, when a certain greater amount of the commodity is paid. Let us call this greater amount the Better Amount (BA). It would be better for the Payer and/or the Receiver if the Original Amount (OA) had the Per Unit Cost (PUC) of the Better Amount (BA). The goal of an EVPM is to convert the OA's PUC to the BA's PUC.

An EVPM can "convert" the Original Amount's
Per Unit Cost to the Better Amount's Per Unit Cost A bet can be set up between the two parties in a commodity payment such that:
The Receiver Can Win the BA
The Receiver's EV equals the OA The Receiver's Cost for Having the Chance to Win the BA is set so that the Expected PUC for the Receiver equals the PUC of the BA.

The Payer's Expected PUC will also equal the PUC of the BA.)

In the case of exchanges, where the Receiver pays something to the Payer for the OA, it is often possible to set up a bet such that:

The Receiver's Cost Paid to the Payer For the Chance of Winning is equal to the Receiver's Cost Paid at the OA and The Receiver's EV Is Set to an Amount, Greater than the OA, that makes the Expected PUC of that amount equal to the PUC of the BA.

(Again, the Payer's Expected PUC also equals the PUC of the BA.)

The examples below illustrate.

EXAMPLES (Technically, the Expected PUC must include the cost of making a bet. For simplicity, we ignore this cost. Further, the Expected PUC should include taxes in certain cases. Taxes are also ignored for simplicity and because the law is unwritten on this subject.)

Purchasing Pens

Let us assume that a store can buy 50 pens from a distributor for $100. The store's PUC then is $2 per pen.

Let us further assume that the store can buy 500 pens for $500. The store's PUC for this amount is $1 per pen.

The store manager decides he would like to get pens at the $1 rate but he does not have $500 in his budget to spend on pens. Therefore, he feels the best investment is to enter into a bet with the distributor such that:

The store pays $100

The store can win 500 pens (which cost $500) and

The store's chance of winning is 1/5.

The store's EV then is 100 pens; hence the Expected PUC is $1 per pen.

Odd Lots of Stock

Let us assume that you want to buy 80 shares of a certain stock. You call your broker and he says, "If you buy 80 shares, the share price will be $1.60. I recommend you buy 100 shares instead. The price then will be 1.50 per share." You say, "But I've only got $128.00 to invest." The broker then says, "You can make the following bet:

You pay the $128.00

You can win the 100 shares (which cost $150.00) and

You have have a 128/150 chance of winning.

The expected number of shares you receive is 85 and 1/3 making the expected price per share $1.50"

Data-Base Time

Imagine that a student wants to do some research through a database. The database company's rates are: $30 per hour if one hour is used and $10 per hour if 5 hours are used. The student does not want to pay the $30 per hour rate but is willing to make a bet to try to get the $10 rate. The student must decide how much to pay to try to win and how many hours to try to win. Imagine then that a bet is set such that:

The student pays $20

The student can win 5 hours of data-base time (which cost $50)

The student's chance of winning is 2/5.

The student's EV is 2 hours; the Expected PUC is $10 per hour.

Tollbooth

Consider a tollbooth into which drivers pay $1 for a "pass through". The driver incurs a time cost for each pass through. There is also a time cost for the toll authority in handling the payments. In fact, the receiver in this case is not the driver, it is the toll authority and the commodity received is money and the unit is $1. This case is a good example of a large payer cost. It is important to note that while we can say that the PUC of a "pass through" is lowered, that is actually because the cost of paying $1 is lowered.

The per unit time costs would be reduced if only one out of, say, 20 drivers has to pay. This can happen if each driver makes a bet with the toll authority such that: The toll authority can win $20 from each driver, The toll authority's chance of winning is 1/20. (The toll authority pays for the chance to win by forgoing the $1 payment.) The toll authority's EV is $1 and each driver's expected payment is $1. Both parties save time since only one out of every twenty drivers must stop.

(This example is simplified of course because a different type of toll plaza should be constructed so that each driver can make a bet yet only stop if he or she loses.)

Dividend Check

Let us assume that General Motors is paying a stockholder a $0.25 dividend and paying this amount by check. Let us further assume that the cost of writing the check is $0.60. G.M.'s PUC (assuming $0.25 is one unit) is $0.60.

Now, if G.M. was paying a $25,000 dividend with a check, the cost of writing the check would still be $0.60 (we are assuming). Taking our unit to be $0.25, there are 100,000 units in the $25,000 dividend. Hence the PUC is $0.60/100,000.

Now, G.M. can make a bet with the dividend Receiver such that:

The dividend Receiver forgoes the $0.25 dividend,

The dividend Receiver then gets the chance to win $25,000 and

The dividend Receiver's chance of winning is 1/100,000.

The dividend Receiver's EV is $0.25 and G.M.'s expected payment is $0.25. But the point is that G.M.'s Expected total cost of paving the $0.25 dividend is 1/100,000× 0.60 (the amount it takes to write the $25,000 check))= $0.000006, instead of the original $0.60.

Rounding Purchase Prices-Eliminating Coins

Consider a typical cash purchase at a store, a candy bar being bought for $0.40. In this case, the commodity being considered is money which is being paid in the form of coins. A bet can be setup such that:

The store can win a $1 bill from the customer

The store's chance of winning is 40/100.

The store's EV is $0.40. The customer's Expected Payment is $0.40.

A purchase is paid for with $1 or $0. Therefore, both parties save the time cost of dealing with coins.

Note: You can see that an EVPM can lower the EPUC of a commodity even when only a single unit of that commodity can be received. For example, one "pass through" is bought by betting with a toll authority for $20 instead of definitely paying $1. The EPUC of a "pass though" is lowered though nobody is betting for more than one "pass through". It seems this situation violates the principle of lowering the EPUC of a commodity by allowing the receiver the chance to win more of that commodity than is originally intended to be received. Yet the principle holds because the reason that the EPUC is lowered is that the commodity is paid for and the payment has a lower EPUC because of betting. Any reduction in EPUC of a commodity that is NOT bet for requires that the payment for that commodity IS bet for, the bet being for a larger payment than was originally intended.

Further Note: One way of setting up EVPM bets is not by deciding an amount to bet for but instead to set an odds multiplier (it need not be an integer multiplier) to apply to the original amount of a commodity intended to be paid. For example, McDonalds might want to have a lane where everybody has a b 1/10chance of losing. Those who lose have to pay ten times their check.

Sometimes this application of an EVPM is more convenient, particularly in the case of lines. It still relies on the principle of betting to a greater amount of a commodity, it just makes it easier in certain situations to set that amount.

Hybrid Payments

Hybrid payments are those where part of the payment is made in the conventional way and part is made in the EV way. In a hybrid payment:

The Receiver definitely receives an amount, X, of a commodity.

The Receiver also pays for the chance to win an amount, Y.

X+Y=the BA. The OA is somewhere between X and Y.

If the Receiver wins the bet, he gets the BA (the winnings, Y, are added to X). If the Receiver loses, he gets X.

The Expected PUC of hybrid payments can be lower (but not necessarily) than the PUC of payments of the OA. The example below demonstrates.

Hybrid Purchase of Eggs

Say a person can buy 16 eggs for $1.60 cents, 10 cents each. Say further that the price of 24 eggs is $1.92, 8 cents each. And the price for 12 eggs is $1.32, 11 cents an egg. And say the person has $1.60 to spend. The person decides to definitely buy 12 eggs and bet his remaining money to try to win 12 more eggs. If he wins, he gets 24 eggs at $1.60. If he loses, he gets 12 eggs at $1.60. To make the bet, he must put up $1.32 to definitely buy the 12 eggs. He has 28 cents left over to bet.

A bet can be set such that:

He puts up the 28 cents

He can win 12 eggs and

His chances of winning are 28/60.

His EV then is, 28/5 eggs or 5.6 eggs. His total EV is 12+5.6 (17.6) eggs at a cost of $1.60, a little over 9 cents an egg. The store cannot complain because its expected revenue for the extra 12 eggs is 60 cents. The 60 cents is added to the $1.32 equalling $1.92, the amount the store charges for 24 eggs.

Transferring Expected Savings

When an EVPM is used, as illustrated in the examples above, one or both parties in a bet have an Expected PUC lower than the PUC of the OA. Hence, one or both parties has an Expected Savings.

It is possible for a party, call it the first party, to transfer all or part of its savings to the other party, up to the point that the first party's Expected PUC is no worse than its PUC at the OA. The bet between the parties can be set so that any percentage of one party's savings are transferred to the other party. The bet can be set that way by varying the three values that make up a bet: The Receiver's Chance of Winning, What the Receiver Can Win and, The Receiver's Cost For Having the Chance of Winning. The examples below illustrate.

Purchasing Pens Revisited

In the example used above where pens are hypothetically purchased by a store from a distributor, the store's original purchase is 50 pens for $100, a PUC of $2. By making a bet in which the store can win 500 pens with 1/5 chance of winning the pens and at a cost of $100, the store gets an EV of 100 pens for $100, $1 per pen. This represents a savings of 50 pens. The store can transfer this savings to the distributor by changing the odds on the bet such that:

The store pays $100,

The store can win 500 pens and

The store's chance of winning is 1/10 (instead of 1/5).

The store's EV is then 50 pens for which the store has paid $100 making the Expected PUC $2 per pen. The store has lost nothing relative to the original purchase while the distributor has an Expected Payment of 50 less pens.

Dividend Revisited

In the example of the dividend check, G.M.'s original payment was $0.25 plus the cost of making that payment, $0.60, a total of $0.85. By making a bet with the stockholder, G.M had an expected savings of $0.599994. This can be transferred if a bet is set up such that: The stockholder pays for the chance of winning by forgoing the $0.25 dividend The stockholder can win $84,999.40 (instead of $25,000) The stockholder's chance of winning is 1/100,000. The stockholders EV is $0.84.9994 cents. G.M.'s expected total payment is:

$84,999.40+$0.60 (the cost of writing the check)×1/100,000= $0.85.

Rounding Purchases-Eliminating Coins Revisited

In this example, a customer buys a candy bar for 40 cents. Let us just focus on the time costs for the store in receiving payment. Assume that the time costs are quantified by the store at 10 cents for receiving the 40 cents. Let us further say that the store quantifies the time cost of receiving a $1 bill at 5 cents. The question then is what are the PUC's in each case. If, out of a 40 cent payment, 10 cents go into time costs, the store can really only say that it has received 30 cents at a cost of 10 cents. If, out of a $1 bill payment, 5 cents go into time costs, the store can only say that it has received 95 cents at a cost of 5 cents. Assume a unit is 1 cent. The PUC's in the first payment are 10/30 of a cent for each cent received and the PUC in the second are 5/95 of a cent for each cent received.

The store can then make a bet such that:

The store forgoes the 40 cent payment

The store can win a $1 bill

The store's chance of winning is 30/95 or equivalently (30+150/95)/100.

The customer's expected payment then is 30 and 150/95 cents instead of 40 cents. The stores EV is 30 units plus 150/95 units. The 150/95 units are actually the cost for the store of receiving the 30 units, which is the same PUC as at a payment of $1.

An EVPM Used By Businesses To Increase Revenue By Offering Betting Customers a Better Expected Price For a Commodity Than Is Offered to Conventionally Paying Customers In certain situations, businesses can offer customers who bet to win an amount of a commodity a lower Expected PUC than customers who pay conventionally for that amount. In this case the EVPM does not lower Expected PUC's by giving Receivers the Chance to win an amount greater than a certain amount but instead by giving them the chance to win that certain amount itself.

Bettors can get a better Expected PUC because of the cost structure of certain businesses. Businesses that have low variable costs in particular-such as airlines, hotels, databases, T.V. stations and communications networks-can use an EVPM to offer bettors lower Expected PUC's. The businesses in return get greater revenue and therefore greater profits. The key to using an EVPM in this way is the ability of a business to segment customers according to those who are willing to bet and those who are not. If all customers could bet they all would and the business would get less revenue. But, in certain situations, businesses can profitably segregate customers. The example below illustrates.

Assume an airline charges $200 for a coach seat and $400 for a first class seat. The airline can give customers who purchase a coach seat the chance to bet to upgrade to a first class seat, if first class isn't full. The bet could be set up such that:

The customer pays $50

The customer can win a first class upgrade.

The customer's chance of winning is 1/2.

The customer's expected cost is $100. Hence, given that the customer has paid $200 for the coach seat and and expected cost of $100 for the upgrade, the total expected cost of the first class seat is $300.

The key for the airline is to stop passengers who would normally pay $400 for first class seats from buying coach seats and betting until they won a first class seat. The airline thus would have to limit the number of bets a coach passenger could make to upgrade.

Is an EVPM Legal in Places Where Gambling Is Illegal?

An EVPM should not be looked at as harmful gambling. It is a more efficient payment method in many situations. And it can be applied so that it does not expose people to damaging losses.

Further Discussion of the Scope of an EVPM

This application discloses that an EVPM is a very general method that can be used in numerous specific situations to lower expected per unit commodity costs. The question then arises, if someone else has come up with a given, specific use of an EVPM, has this person also thought of any other uses?. I think not. It is hard to say for sure what is an original, new use for an EVPM because we have no good theory of idea origination. Good ideas are usually obvious in retrospect but not in prospect.

The inventor will try to divide the general use of an EVPM into separate, still somewhat general uses which seem different from each other in that each seems to require a new leap of imagination to perceive. For example, the realization that General Motors can agglomerate its small dividend payments into one big payment to be won by one shareholder is clearly not the same as the realization that purchases at stores can be rounded fairly only by betting. And this realization is clearly not equal to the realization that all purchases can be "converted", by betting, into integer multiples of one denomination. These cases are different manifestations of a central idea, that betting for a certain amount of a commodity can often yield lower EPUC's than paying conventionally for a smaller amount. Yet, if one does not see the unifying idea, the manifestations are different ideas. Analogously, electricity and light were once thought to be very different things and are now known to be manifestations of the same fundamental force. The purpose of the discussion just below is to stake out the inventors priority and to better explain the uses of an EVPM.

1) An EVPM can take advantage of the cost structures of certain businesses to give betting customers lower PUC's than conventionally paying customers. This use is the most different from the other uses because the Receiver of a commodity is not betting to receive a greater amount of the commodity than was originally intended to be received.

2) An EVPM can be used to take advantage of the fact that sellers can offer lower per unit prices on certain commodities as certain greater amounts of those commodities are sold as is seen, for example, in the difference between wholesale and retail prices.

3) An EVPM can be used to group many small payments into one big payment that is dispensed as in a lottery.

4) An EVPM can be used by a Payer to reduce the number of payments needed to be made. For example, a company can have an agreement with certain other companies that any payment under $500 will be bet such that the company pays either $500 or $0.

5) An EVPM can be used by Receivers to reduce the number of payments received. For example, a magazine publisher can include means on its business reply cards for subscribers to bet as to whether they will pay for the subscription. If they win they pay nothing. If they lose, they agree to pay more. Likewise, in electronic funds transfers, the Receivers and the Payers of the funds can agree that a bet will take place if the amount to be transferred is under a certain amount. Such betting would reduce the overall traffic of electronic funds transfers. Depending on how this use of an EVPM is phrased, it may seem very similar to the use mentioned in #4, but the implementation is very different, pointing out that it also seems to be a different idea and therefore a different use.

6) An EVPM can be used to round purchase amounts to desired denominations.

7) An EVPM can be used to speed up the movement of lines where payments are made. Such lines can move more quickly if fewer payments have to be made.

8) An EVPM can be used to transfer betting risk from one party to another, thereby allowing bets for large amounts of a commodity to create greater efficiencies.

9) An EVPM can be used to simplify variety. Explained below is perhaps the best example.

A PROPOSAL FOR OCCAMING OUR CURRENCY

Occaming is a fake word created from the name of William of Occam, a philosopher who in the early thirteen hundreds said, "It is vain to do with more what can be done with fewer." This idea, called Ocx, am's Razor, is an important criterion for judging scientific theories. Its familiar form is, "Entities are not to be multiplied beyond necessity."

You may have considered the time people spend counting, carrying, storing and sorting the penny. If so, you probably realize that the penny is more trouble than it's worth and should be eliminated. But have you ever considered the possibility of really occaming our currency by replacing all our bills and coins with one bill or coin? That way people and businesses wouldn't have to spend so much time handling currency, an activity that costs society a great deal in total.

In fact, we can occam to one bill or coin, by adopting an Expected Value Payment Method (EVPM). With an EVPM we can hold the amount that a store (or any receiver of payment) can win constant at a given denomination, say, $20. Then we can vary the odds so that the store's expected value will equal the price of any item being bought, if that item is less than $20. Hence, all payments can be made in multiples of the denomination being used.

(In the case where an item is more than $20, say $85, a bet could be made for a multiple of $20, say $100. Or, the purchase price could be divided by $20 and the remainder would be bet for. For example, in the case of an $85 item, one would pay four twenties and bet to round up or down the remaining $5.)

If an EVPM was adopted universally, only one denomination would be needed. Stores would no longer make change. Store receipts could immediately go into drop safes. And, stores would not need a float meaning a country would have less money tied up in float leaving more to go to productive investment.

Obviously, it is possible to occam currency less and have more than one coin or bill. If a country has two denominations of currency, one big and one small, people who fear losing can bet small sums and not risk serious loss.

Expected Value Payment Execution Methods and Systems

This application discloses an Expected Value Payment Method (EVPM) using a Random Number Supplier (RNS), or the equivalent, to decide the outcome of bets for the purposes described in the preceding part of the application. An RNS is a device that upon some input generates a random number (RN), randomly selects an RN from a set of previously generated RN's or, supplies an independently generated and selected RN. An RNS can also be a device or method that combines inputs from parties in a bet to yield a number that is fair to both.

Also disclosed are Expected Value Payment Execution Methods and Systems (EVPEMS's) that make an EVPM practical in the marketplace. For simplicity, "EVPEMS" will be abbreviated by "Z".

Executing a Bet Defined

The term "executing a bet" covers more than one possible act. At minimum it requires supplying an RN for deciding a bet. It can also include setting the odds on a bet, the Bet Amount and who is to win the Bet Amount. It can also include other functions that aid the parties in a bet to set these and other values, particularly the EP. All the values for a bet can be set in the heads of the parties involved and even the RN can be arrived at by combining inputs that come from the minds of the parties involved so no device is actually necessary to execute a bet. The point is that "executing a bet" is not an exact definition and Z's will be described that carry out one or more functions for executing bets. A Z's functions may not be in a single device and may even be duplicated in an EV payment. Along with the mandatory RNS, register methods and systems for an EV payment may be used. Various possibilities are described below.

A) Minimum Z

At minimum a Z includes an RNS of a given range that allows people to decide a bet. The Z need not aid the execution of a bet in any other way. A system or device that aids in EVPM bets but does not include or is not connected to an RNS is an Expected Value Payment Register System (EVPRS). While the following discussion will refer to Z's, the comments will apply to EVPRS's as well where relevant.

An RNS can be variable to conveniently handle the odds on any bet. The RNS can thus randomly select from any required range of numbers. To be variable, the RNS requires means for inputting the range. The step of setting the odds would of course include setting the proper range for those odds.

A convenient RNS for an EVPM is one where the set of possible RN's is a consecutive set of integers starting at "1", with the number of integers being equal to the number of units in the amount of the commodity being bet for. For example, if a person bets whether or not to pay $1, the number of units in the amount is usually considered to be 100 (pennies).

B) Z's That Allow Inputting of the Chances of Winning and That Declare a Winner

This type of Z includes means for inputting the chances of winning a bet, means for supplying an RN (the RN need not be displayed), means for calculating whether the RN is a win or a loss for a party and, means for displaying or otherwise communicating a win or loss.

C) Z's That Allow Inputting of the Chances of Winning and the Amount That Can Be Won and That Declare a Winner This type of Z requires the same means as "B" and in addition means for inputting and displaying the amount that can be won.

D) Z's That Include the Expected Value (Expected Payment)

In an EVPM, the expected value for the Receiver, we will call it the Expected Payment (EP), must be known. We have then three values that must be known in an EVPM: the EP, the odds, and the BA (Bet Amount or "Better Amount"). Given any pair of these values, the third can be calculated. In addition to having an RNS, a Z may allow one or more of these values to be inputted, pre-set, or calculated. There are 14 possible Z's depending on what values are inputtable, set or calculated. As soon as any two values have been established, the third is automatically calculated.

| 1 EP set | BA set | Odds set |
| 2 EP set | BA input | Odds input |
| 3 EP set | BA input | Odds calculated |
| 4 EP set | BA calculated | Odds input |

| 5 EP input | BA set | Odds input |
| 6 EP input | BA set | Odds calculated |
| 7 EP input | BA input | Odds set |
| 8 EP input | BA input | Odds input |
| 9 EP input | BA input | Odds calculated |
| 10 EP input | BA calculated | Odds set |
| 11 EP input | BA calculated | Odds input |
| 12 EP calculated | BA set | Odds input |
| 13 EP calculated | BA input | Odds set |
| 14 EP calculated | BA input | Odds input |

A few examples illustrate how the different Z's above suit different situations.

1 is a Z that can be used at a tollbooth where the EP, the BA and the odds are set ahead of time.

6 is a Z is that can be used in a grocery store to round change by betting. In this situation, the amount to be bet for, $1, is set and the amount of change to be rounded, the EP, varies.

9 is a Z that can be used in a store where purchase amounts are variable and the amount to be rounded to varies as well, as in when a customer decides what denomination to round to.

FIG. 1 illustrates a Z in which all three values, EP, BA and odds can be inputted. This Z has computing means connected to means for inputting the various values 1 and connected to display means 2 for displaying the values. The computing means calculate any third value once the first two have been entered and upon pressing of the random number input 3, supplies an RN and also calculates and displays the winner based on that RN (we say that the party that might or might not have to make the payment is the party that wins or loses though both parties win or lose).

A Z can register and record information needed to specify who is making the bet and other bet information. Such Z's are described in the sections on cheat prevention.

Other Values That May Be Useful

It would be helpful for a Z to give other values in addition to the EP, BA and odds when the parties in an EV Payment want to know the costs involved in an EV payment or want to compare the costs versus a conventional payment or want to compare the costs of different EV payments.

A Z that allows parties in an EV payment to evaluate costs is especially useful to the Receiver where the Receiver makes a payment to the Payer in exchange for getting the expected payment from the Payer. For example, a person buying pens might say to the pen distributor, "Okay, I have $100 and I'd like to buy pens at the best rate and I'd like to have a 10% chance or better of getting them, what are my options?" Or, "Hey I have $100, I want to buy 50 pens definitely and bet for the rest at the best rate with a limit of 1,000 pens, what are my odds?" Or "Hey, I want an EP of 100 pens, how much do I have to pay for that if my chances are 20% of winning?"

To allow people to evaluate and execute an EV payment, a Z can include means for inputting, registering, recording, calculating, supplying and displaying (or otherwise communicating) one or more of the values below. (Other values may be relevant in certain EV payments.)

Figure 2:
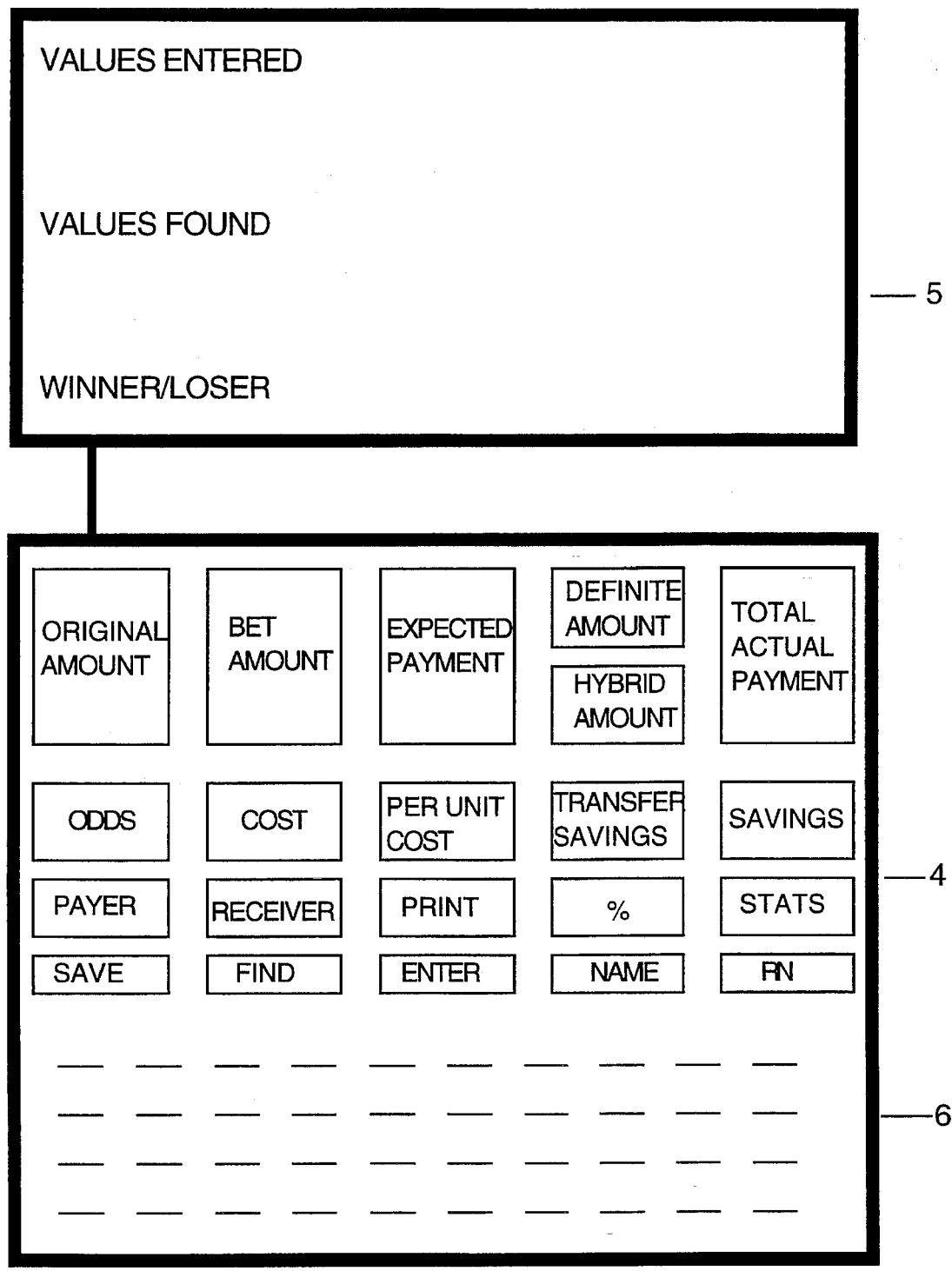
FIG. 2 shows an EVPES that allows many useful values to be inputted, calculate and displayed.

The Original Amount of the Commodity To Be Paid and Received
The Original Cost of Paying the Original Amount
The Original Cost of Receiving the Original Amount
The Original PUC of Paying the Original Amount
The Original PUC of Receiving the Original Amount
The Amount Definitely To Be Paid and Received
The Cost of Paying the Definite Amount
The Cost of Receiving the Definite Amount
The Amount That Can Be Lost By the Payer and Won By the Receiver
The Cost of Paying the Amount That Is Bet For
The Cost of Receiving the Amount That Is Bet For
The PUC of Paying the Amount That Is Bet For
The PUC of Receiving the Amount That Is Bet For
The Cost of Paying the Amount That Is Bet For+the Amount Definitely to Be Paid and Received
The Cost of Receiving the Amount That Is Bet For+the Amount Definitely to Be Paid and Received
The PUC of Paying the Amount That Is Bet For+the Amount Definitely to Be Paid and Received
The PUC of Receiving the Amount That Is Bet For+the Amount Definitely to Be Paid and Received
The Chances of the Payer Winning
The Chances of the Receiver Winning
The Expected Amount of the Commodity To Be Paid and Received
The Cost of Paying the Expected Amount of the Commodity
The Cost of Receiving the Expected Amount of the Commodity
The Expected PUC of Paying the Commodity
The Expected PUC of Receiving the Commodity
The Expected Increase In the Amount To Be Paid and Received Over the Original Amount
The Expected Cost Savings Over the Cost of the Original Amount for the Payer
The Expected Cost Savings Over the Cost of the Original Amount for the Receiver
The Expected PUC Savings for the Payer
The Expected PUC Savings for the Receiver
Amount of Expected Savings To Be Transferred to the Payer
Amount of Expected Savings To Be Transferred to the Receiver
The Range of Numbers That Will Win For the Payer
The Range of Numbers That Will Win For the Receiver
The Random Number that Decides the Bet
Who Has Won the Bet
The Total Actual Amount of the Commodity Paid and Received
The Total Actual Cost of Paying the Commodity
The Total Actual Cost of Receiving the Commodity FIG. 2 shows a Z that can do this.

The Z has programmable computing means connected to input means 4 and display means 5. The input means allow any value to be inputted and displayed. To input a value a person presses one of the labelled keys and then enters the value on the keyboard and can enter the name of a commodity with the keyboard 6 as well. More than one labelled key may be pressed in succession to yield a given value. For example, the "%" key may be pressed after the "savings" key to give savings as a percentage. Various cost figures can be stored in the memory of the Z. The Z's computing means can calculate and store and recall any values necessary provided they are mathematically possible. If a mathematically impossible value is requested, the Z displays, "not possible". Naturally, to calculate given values, enough information has to be entered or has to be in memory. The Z can also upon the pressing of the RN input, supply the RN and declare a winner.

Printing Record and/or Displaying It on Screen

A Z can prim receipts, store each transaction in memory, and display them all on paper or a screen.

Tabulating Totals

As with conventional Payment Execution Systems, like cash registers, it may be useful for a Z to record and tabulate payment totals. A Z can have means for tabulating and recording total bets made during a period, wins and losses and, expected wins and losses. A Z can have computing means for statistically analyzing the results of bets during a period to see where the results fall on the normal curve and thereby show if they are highly improbable and should be investigated. The Z can have means for printing all this out on a tape or a screen.

Z's That Accept Payment

Z's can accept payment as in cash registers with drawers and vending machines. Also a Z can return payment upon a loss by the party that controls the Z. Payment collection can be separate from the part of the Z that executes bets. For example, a company can bill the losers of bets or, in the example of a cafeteria, customers can all bet at one station and the losers can pay at another.

Break Even Z's

A Z with a special type of RNS can insure that, over a large number of purchase bets, a party wins an amount equal to the expected value of those bets. It is possible for the party to come out even if the RNS (it would be programmable) is not exactly random. For example, if a store wins in excess of the expected value in, say, 2000 bets, the RNS can cause it to lose by the excess amount over the next 2000+ bets (because bet amounts are usually random, it is usually impossible to insure that losses will exactly equal gains over exactly 2000 bets). If the RNS can keep track of a store's excess wins and losses, the RNS, not truly random, can keep the excess near zero by slightly increasing the chance of losing or winning, whichever is necessary, on individual bets. Infinitely many algorithms can insure that the Z comes out even while leaving the RNS effectively random for both parties in a bet. For examples, if the odds for a party should be 80% chance of winning and that party has an excess of losses, an algorithm could simply add 0.5% to the party's chances of winning. This kind of RNS may be especially useful if controlled by a neutral party.

Applications of Z's

In ordinary payments, there are usually payment execution systems in place that include one or more, of the following functions: inputting, accepting, registering, calculating, recording and displaying the payment. Some examples are cash registers, vending machines, debit card networks, tollbooths, electronic stock exchanges, and telephone sales operations. A Z can be incorporated into conventional payment execution systems. Payments can then be made by the expected value method, conventional method or, a combination of the two. Three applications follow.

1) Z in a Cash Register

Figure 3:
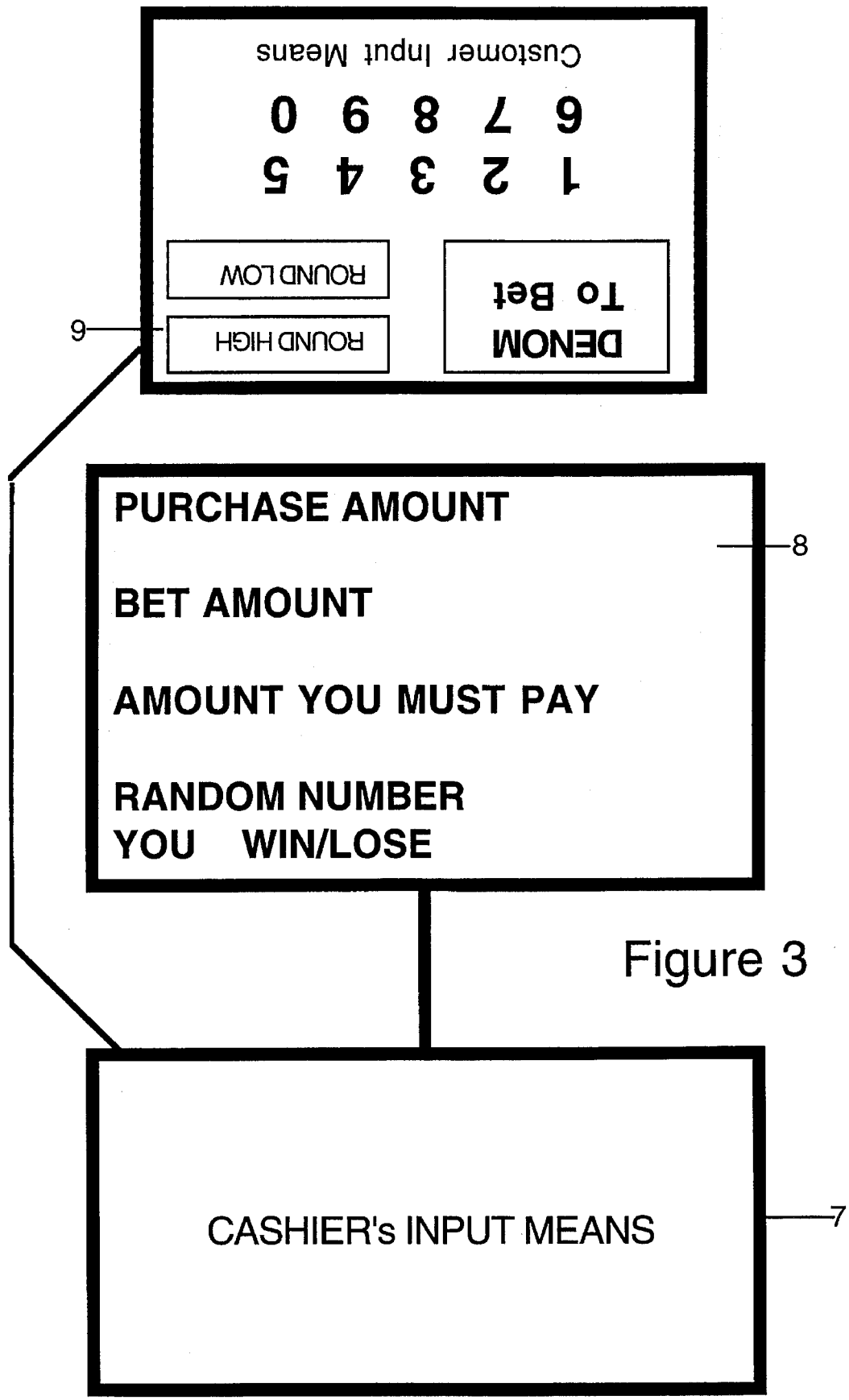
FIG. 3 shows an EVPES incorporated into a cash register.

A cash register with a Z requires (FIG. 3 illustrates):
A) Means for totaling up a Purchase Amount 7.
B) Means for displaying the Purchase Amount 8.
C) Means for inputting the Bet Amount.

The Bet Amount can actually be pre-set. Or it can be automatically set depending on the purchase amount. Or, it can be input by the store clerk. Or, as in FIG. 3, the customer can optionally use means for inputting a denomination to be rounded to 9. The customer can also have the option of betting the full amount of the purchase rounded up by the denomination being selected or of betting only the denomination being selected with the rest of the amount being definitely paid. (The clerk of course can enter all these values upon asking the customer his or her preferences.)

D) Means for displaying the Bet Amount and for calculating and displaying the amount definitely to be paid.

E) Means for setting the odds so that the Purchase Amount equals the EP of the bet plus the amount to be definitely paid.

F) Means for executing the bet (supplying the RN and declaring a winner).

Optional

G) Means for recording the transaction on a register tape.
H) Means for recording transactions in electronic memory.
I) Means for printing out the totals of transactions over a given period of time.
J) Means for collecting payment.
K) Means for storing payment.

2) Z in a Vending Machine

A vending machine with a Z requires the following:

A) Means for enabling customers to input a purchase amount (EP) by making a selection of what is to be bought. The machine may include means for displaying the purchase amount.

B) The machine may allow one bet amount. Or, it may allow the bet amount to be variable. If so, the machine requires means for the customer to input the bet amount. The bet amount may be displayed.

C) Means for accepting payment from customers. Payment may equal the bet amount or be greater than the bet amount (in case only part of the payment is being bet).

D) Means for executing the bet, after the bet amount has been set, upon acceptance of payment or upon some other input.

E) Means for keeping the bet amount if the machine wins the bet and for returning the bet amount if the machine loses.

F) Win or lose, means for dispensing the item(s) being bought.

Figure 4:
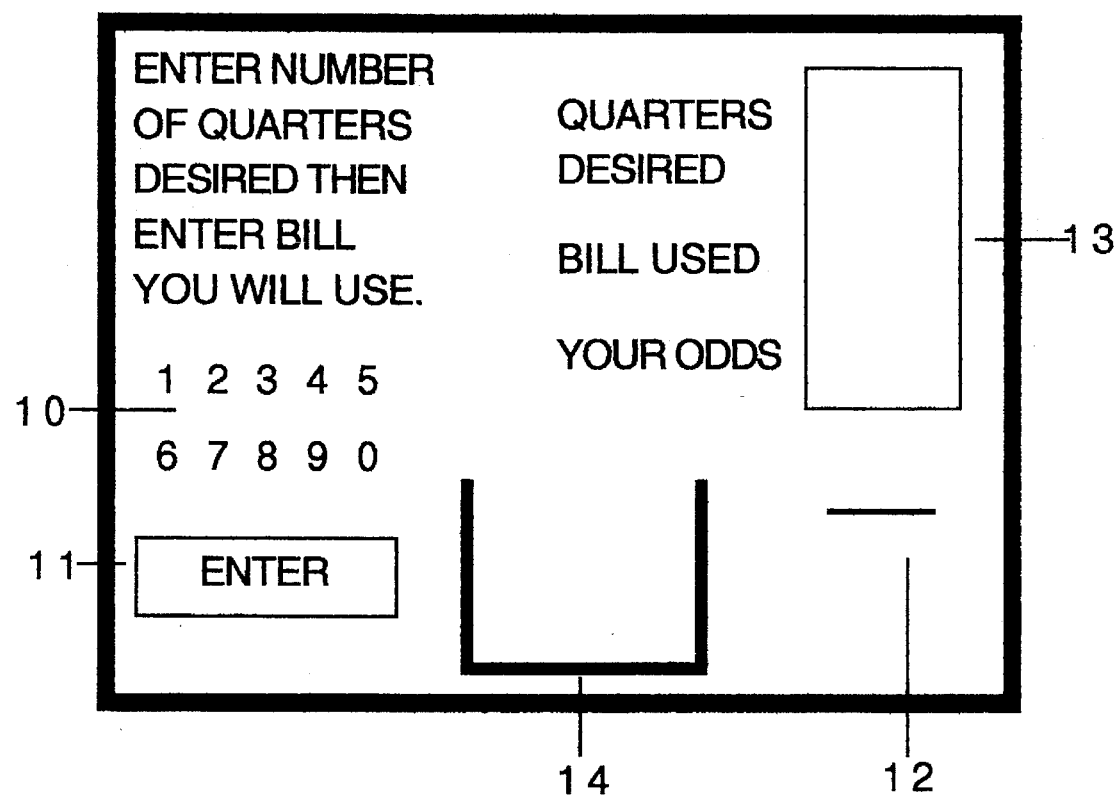
FIG. 4 shows and EVPES incorporated into a vending machine.

For example, a microprocessor based machine might dispense quarters as in FIG. 4, The machine has a numeric keypad 10 and an "enter" button 11 for a customer to enter how many quarters he or she wants. The customer inputs an amount to be bet by inserting that denomination in the bill reader 12. The machine calculates the odds and then displays the number of quarters, the bet amount and the odds on display means 13. Upon verifying the bill is genuine, the machine executes the bet, announces the winner and keeps the bill upon winning and returns it upon losing. The quarters are then dispensed.

3) Z on a Computer Linked To Another Computer

Purchases by computer cover a large range of buying from electronic markets, to electronic funds transfer to homeshopping and more. An EV Payment can be carried out by two parties communicating by linked computers. One party's computer (call it the host computer) can have software enabling one or both parties to pre-set, enter or calculate the three crucial values for a bet: the EP, the BA and the Odds. Other useful values, previously described, can be entered or calculated as well. When the bet is set, the host computer can supply an RN and declare the winner. The transaction can then be fully recorded by one or both computers. The values can be displayed on the screens of both parties. Of course displaying on screens is not mandatory.

Means in Expected Value Payment Execution Systems (Z's) For Preventing Cheating

If the parties involved in an EV payment bet do not trust each other then they must be sure that cheating does not occur. Therefore, also disclosed are Z's with means for preventing cheating in EV payment bets. The means and methods for preventing cheating can be surprisingly subtle, just as methods of cheating can be. A Z need include these means and methods only where the prevention of cheating cannot be accomplished by social pressures alone. Social pressures work along with concrete means to stop people from cheating. The most important social pressure is usually the witnessing of a bet by other people.

Let us then look at the basic possibilities for cheating and the basic approaches for preventing cheating.

Each party in a bet needs to defend itself against cheating by the other party. Further, if a party has an agent conducting the bet the party may have to prevent the agent from cheating in cahoots with the other party. An example is a store protecting itself from employee cheating in cahoots with customers. In the rest of this application, "agent" will be interchangeable with "employee".

People can cheat in three basic ways

I) A person can cheat by setting the BET after receiving information about what RN will be used in that BET.

In a game of roulette, this cheat corresponds to a person placing his chips on the table after the ball has landed in a slot on the wheel.

To prevent this cheat, a Z requires means for insuring that the BET is set before any information about the RN is revealed Of course, information refers to information that can be used to gain advantage. Usually, "information about an RN" means that the RN is revealed. For simplicity's sake, the phrase "RN is revealed" will include "any helpful information about an RN is revealed".

"Setting the BET" refers to committing to all the terms of a bet in such a way that the commitment can't be changed. It is necessary to uniquely specify a BET for the purpose of preventing cheating. A BET may therefore also include such information as who has made the BET. A bet can be further specified, for instance, John Doe's $10 bet on red at table #19 at 10:01 p.m.. What is required to uniquely specify a bet depends on the situation.

To demonstrate that a BET is set before the RN is revealed, a Z can have means for registering the BET and for signifying acknowledgement of the terms as in a contract.

Society has several means for demonstrating acknowledgement of terms. One is a signature. Often, rules of procedure are needed so that it is understood that a signature is only given after terms have been recorded or registered. Signatures need not be on paper but can be on electronic media (an example is electronic writing pads like those used by UPS delivery persons). If a bet is being executed by computer, an unforgeable, public key based, digital signature can be used. A signature is one type of tamperproof record. There are others. Audio and videotape can be used. Paper records and computer memory can also be used, particularly if a third party is monitoring a bet. The key is that the record be tamperproof.

Another means for demonstrating that a BET is set before the RN is revealed is to make the RNS so that it is only able to supply an RN after an input signifying that terms are set has been activated. This input can be part of another act. For example, putting money in a vending machine can be acknowledgement of a bet with that machine and the vending machine can be made so that it only provides an RN after the payment is made. If the purpose of the input is just to acknowledge the terms of the bet, then we will call it a lock-in procedure or lock-in button.

II) A person can cheat by trying for a new RN after an unfavorable one has been revealed.

This cheat corresponds to respinning a roulette wheel after a loss.

To prevent this cheat, a Z requires means for insuring that only one RN is revealed (can be used) in a given bet Obviously, a party that does not control the RNS cannot retry for an RN. A person betting in a casino can't just respin the roulette wheel. If a party does control the RNS, there are three physical means for stopping a redo:

A) An RNS can be made so that it shows clearly each time an RN is supplied. If the party that does not control the RNS can see such an RNS in operation, the party that controls it cannot retry for an RN.

B) An RNS can be made so that it can register a BET and then only supply one RN for that BET. If the party that does not control the RNS witnesses a BET being registered and RN being supplied, he or she can then be sure that only one is supplied for that BET.

B) Tamper-proof means for recording a BET transaction can show that an RNS has only given one RN per BET.

Cheats I and II pose a similar problem when an agent is conducting bets. An agent cannot be stopped from cheating in cahoots with the other party, unless there are tamperproof means for recording the full BET. Even if the other party's RNS is one that gives a record of a BET and is of the type that only supplies one RN after the BET is set, the agent can still cheat by redoing a BET. There must be some means for fully recording every BET an agent makes. This can be done fairly easily if the agent is operating the RNS because the RNS can record each BET, for example if the RNS is in a store register and the agent is a cashier. But, if the agent is on the other side of the BET, as a customer for example, he or she requires means for recording each BET as well. These recording means depend on the situation and are described in the sections on the supplying of fair RN's. The best solution is to have an agent that is not operating the RNS assume the betting risk, providing the risk is small. For example, say a salesman is on a business trip and bets on an expense account and buys dinner for $19 and bets for $20. The salesman bills his or her company for $19 and whether he or she wins the bet is irrelevant to the company. Where the risk is large, it is reasonable for the agent's bets to be recorded.

III) A person can cheat by having an unfair RN generated in the first place.

This cheat corresponds to a rigged roulette wheel.

To prevent this cheat, a Z requires means for insuring that the RN is fair in the first place.

An RN for a bet can come from four sources.

1) The RN can come from an RNS that is potentially controllable by one of the parties involved in bet.

2) The RN can come from combining inputs from both parties.

3) The RN can come from an RN generator that is not controllable by either party but by an independent, neutral party.

4) The RN can come from a random number generator possessed by one party who interacts with the other party using zero-knowledge protocols, in particular, Blum's protocol for cheat-proof coin flipping.

Corresponding to these four sources are four approaches for insuring that a fair RN is supplied:

Inspecting the RN Supplier

The Generation of RN's by Combining Inputs From Both Parties

The Use of Verifiably Independently Determined RN's

The Use of Zero-Knowledge Protocols, In Particular, Blum's Protocol for Cheat-Proof Coin Flipping Over the Phone.

The Next Four Sections of This Application

The next four sections, one for each of the approaches above, will detail Z's that prevent cheating including means for preventing cheats I and II.

Inspecting the Random Number Supplier (RNS)

Assume that one party can potentially control or tamper with the RNS so that the RNS supplies unfair numbers. And assume that no other party can exercise any control over the RN's. In this situation, the threat of an inspection is necessary to insure that the RNS is not rigged or counterfeit.

For convenience, we will call the two parties in a payment Ed and Art, and Ed&Co. and Art&Co. if their bets are conducted by employees. And we will assume Ed is the party that can potentially control the RNS.

8 Payment Situations Where Cheating Can Occur a) A payment between Ed and Art.

b) A payment between an Ed&Co. and Art.

c) A payment between Ed and Art&Co.

d) A payment between Ed&Co. and Art&Co.

Ed's Z may be visible to Art; for example if it is in a cash register in a store. Or, the Z may not be visible to Art; for example if the EV payment is processed by a telephone salesperson. Taking into consideration whether the Z is visible to Art or not makes for a total of eight payment situations. It turns out that four different generic Z's cover all eight situations. These four are described below.

1). Ed's Z Visible to Art

Ed may be concerned about Art claiming that the BET was different after an RN unfavorable to Art is revealed.

The Z should then have means for verifying that Art has agreed on the BET before the RN is revealed. For example, the Z can have a "lock-in" button that Art presses, before the RN is revealed, proving when Art has agreed to the BET.

Art may be concerned about Ed's RNS being unfair

The Z should then have means for assuring Art that the RNS is dispensing fair RN's. The means discussed here is an inspection.

Figure 5:
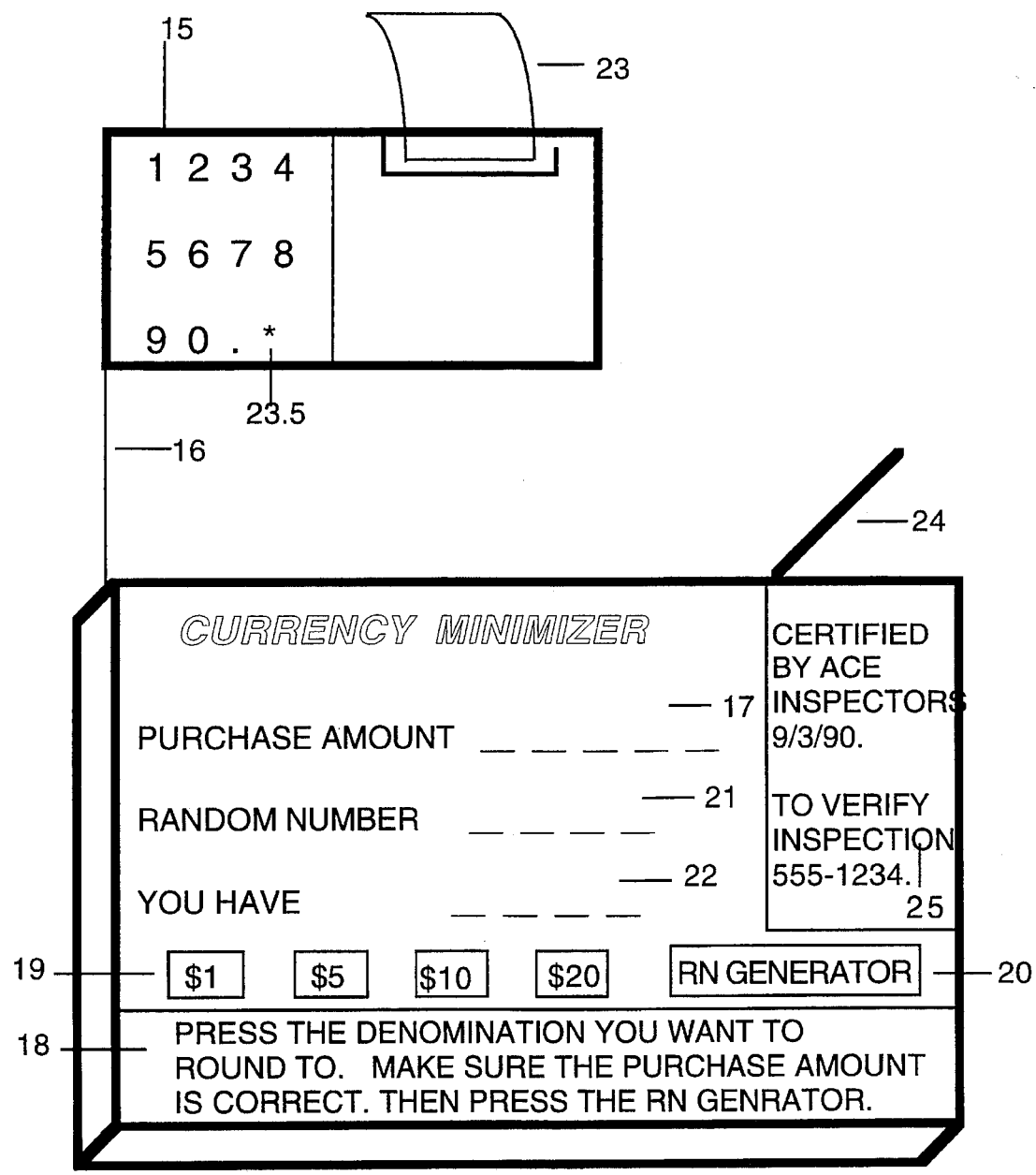
FIG. 5 shows an EVPES allowing purchases to be rounded, by betting, to the denomination of a customer's choice.

Part of a proper inspection includes means for showing Art that the RNS has been inspected. To assure Art that the RNS has been inspected, an inspector must place on the RNS (or nearby) an inspection sticker, or the equivalent information carder, that will be in plain view of Art. The sticker must have the telephone number of the relevant inspection company. Art can then call the inspection company and verify that an inspection of the RNS has indeed taken place and will take place in the future. (FIG. 5, shows such a sticker.)

Art maybe concerned about trying to Change the BET after an RN unfavorable to Ed is revealed The Z should then have means for demonstrating that Ed has agreed on the BET before the RN is revealed. The lock-in button mentioned above is an example of such means. Ares pressing of the button can be agreed to be an acknowledgement of the BET by Ed as well.

Art may also be concerned, that Ed will, try to change the RN if it is unfavorable to Ed.

As long as the Z has means for displaying the RN, it would be silly for Ed to try to change the RN. Still, if An was concerned about this problem, the Z should have means for insuring that Ed cannot change the RN. As an example, a Z could print a receipt each time an RN was revealed.

2). Ed&Co's Z Visible to Art

This situation is the same as the payment situation above except that in addition, Ed may be concerned about cheating by his own employees in cahoots with Art. Ed therefore must prevent his employees from changing the BET after the RN is revealed and prevent them from changing the RN.

Hence, in addition to the means described above, a Z should have:

means for insuring and recording that the BET is set before the RN is revealed and means for insuring and recording that only one RN is revealed per bet.

Illustrations

0) A microprocessor based cash register has a Z incorporated into it for the purpose of automatically setting up and executing bets, resulting in all purchases being rounded to the dollar.

1) The register totals up the Purchase Amount and displays it.

2) The register also displays the BET. (The EP of the BET in this case equals the part of the Purchase Amount that is not even to the dollar. Hence if the Purchase Amount is $5.31, the EP of the BET is $0.31. The BET is decided by an RN from 1–100. The store wins if the RN is from the amount of the EP. Hence in the case of the bet for $0.31, any RN from 1–31 wins for the store.)

3) The clerk then says to the customer, for instance,"Is that all? Are you sure? Please press the 'Lock-in' button." The register has a button on the back for customers to press. The pressing of the button serves two functions. It is the customer's official acknowledgement of the Purchase Amount and therefore the BET. And it is a mandatory step that has to be taken before the register activates the RNS. In fact, the lock-in button does activate the RNS. (Hence, the BET cannot be changed after the RN is revealed.)

4) The RNS supplies only one RN per BET.

5) The RNS's process for supplying RN's is not readable by anyone.

6) The RN is displayed and the register indicates who has won the bet.

7) The transaction is recorded on the store's register tape, thereby making it unfeasible for the clerk to try to change the transaction in any way.

8) On the register is an inspection sticker with the name and telephone number of the inspection company, the ID number of the register and a pledge saying that the register will be inspected in the future.

Electronic registers that can be connected to output devices or to computers can be easily retrofitted with a Z. The Z would receive the bet information from the register and allow customers to bet as in the illustration below (though the illustration is of a Z that is NOT connected to a register).

Rather than retrofit cash registers, it may be easier to use a free standing, electronic RNS. One such microprocessor based device is shown in FIG. 5.

It has a keypad 15 with which the store clerk can enter the Purchase Amount. A cable 16 connects the keypad to the RNS. The Purchase Amount is displayed on a display 17 on the RNS. The RNS has usage instructions 18 for the customer. The customer presses the appropriate button 19 when he or she decides what denomination to round to. The customer then pays the clerk the Purchase Amount rounded up to the given denomination. The customer then presses the button to generate an RN 20. The RN 21 is displayed and "WON" or "LOST" 22 is displayed. The RN is an integer from 1–100, 1–500, 1–1000 or, 1–2000 depending on the denomination the customer chooses. If the customer wins, the clerk gives him or her back one unit of the denomination being rounded to.

To allow management to check whether the clerk has cheated, the RNS prints a paper tape 23 of transactions. Management can check this tape against the register tape. To make the checking process easier, the RNS can print totals when the star button 23.5 is pressed. The totals tell how many transactions have been bet and this number should match the number on the register or else bets have been retried. Further, the totals tell how much the purchase amounts come to and this number should match the total purchase amounts on the register. Also, the totals tell how much has been won or lost by the store and this amount should match the amount in the register.

The RNS is plugged into a socket with an electrical cord 24. The RNS has an inspection sticker 25 with the inspection company's telephone number.

In certain situations, for example in some restaurants, it might be convenient to separate the RNS from the register that tabulates and displays the BET.

In such a situation, a possible means for demonstrating that the BET is set before the RN is revealed is to have a microprocessor based register display and record the BET. This register would also record the time the BET is set along with a sequence number for the BET. The RNS would also be microprocessor based and would include a display and a memory. The RNS would record in memory, the time the RN is revealed along with a sequence number for that RN. Management could call up the memory on the display and then by checking against the register record could see whether all BETS were set before the RN's for them were revealed. The RNS would also record the total number of RN's revealed and this number would have to match the number of BETS recorded by the register.

Also, to demonstrate that the customer has agreed on the BET before the RN is revealed, the customer can be asked to review the bill before the RN is revealed. If the customer acknowledges the bill, he or she can sign it, like a credit card slip. The bill can include a purchase number and RNS ID number.

3) Ed's Z Not Visible to Art (Also applies where Ed&Co.'s Z Is Not Visible to Art) Art may be Concerned about Ed's RN's being fair.

Hence, means are required to insure that the RN's are fair. Again, the means being considered in this case is an inspection.

One type of inspection is to have the RN generation witnessed by a neutral party. Usually it is not feasible to have a witness though. The method then for insuring proper inspections differs from the method used if the Ed's Z is visible.

First, the information that is on the inspection sticker, mentioned above, must still be communicated to Art and it must be communicated before the RN is revealed. Obviously, no sticker is in front of Art, therefore Ed must—before the RN is supplied—inform Art of the RNS ID number, the inspection company and the inspection company's telephone number. Otherwise, Ed can use multiple RNS's, choose the best RN from among them and, then give An the RNS ID number.

Second, Art (or some other parties involved in expected value payments with Ed) must contact the inspection company and give it all the details of his transactions with Ed. That way, the inspection company can verify that bets are being executed fairly, as Ed claims. Otherwise, Ed can claim that a fair RNS is being used while in fact no RNS at all or an unfair one is being used. Of course, so that the inspection company can verify the information given by Art, the RNS must be able to fully record all transactions, including the customer's name, the BET, the RN and the time (or purchase number in order to uniquely specify the BET).

Ed is concerned about Art trying to change the BET after an RN unfavorable to Art is revealed.

Hence, a Z should include means for insuring and recording that Art has agreed to the BET before the RN is revealed. One example is recording the conversation between Ed and Art, if a payment is made over the phone. Another example is a computer-sent message with an unforgeable digital signature using a public-key code system such as RSA.

Art is also concerned about Ed trying to change the BET after an RN unfavorable to Ed is revealed Hence, a Z should include means for insuring and recording that Ed has agreed to the BET before the RN is revealed. Art may also be concerned about Ed secretly generating another RN if the first one generated makes Ed lose Hence, a Z should include means for insuring and recording that Ed can only generate one RN per bet.

To repeat, Ed and Art require means for insuring and recording that the BET is set before the RN is revealed and that only one RN is revealed for the BET.

4) Ed's Z Visible to Art&Co.

(Also applies where Ed's Z is not visible to Art&Co. and where Ed&Co.'s Z is visible to Art&Co. and where Ed&Co.'s Z is not visible to Art&Co.)

In this case the Z is not visible to Art so Art wants to stop his employees from cheating. In addition to the means in situation 3 above, Art requires means for insuring and recording that his employees set the bet before the RN is revealed and for insuring that his employees do not allow Ed to redo a bet. His employees must record terms of the BET and the time the terms are set. This record can then, if necessary, be checked against the record of Ed's RNS.

Illustrations

One way to prevent cheating that includes all the necessary means is to:

Publicly set the BET at a time before the RN is to be revealed and

To announce when and how the RN will be generated and

To allow the RN Generation to be witnessed.

For example, assume that General Motors has decided that all dividend payments under $1 are going into a single pot which only one dividend recipient will win. Before pulling the winning number, GM can announce all the terms of the lottery and allow a neutral inspection company to examine the RNS and to witness the actual RN generation.

An example of a Z that protects against cheating, if inspected properly, is given below:

A client calls his stockbroker to buy 40 shares of Blob, Inc. at $1 a share.

The broker says, "If you buy 100 shares, they will only cost 95 cents each."

The client says, "I've only got $40 to spend."

The broker then says, "You can bet the $40 to win the 100 shares. Your expected cost per share will be 95 cents if the stock doesn't move any from where it is now and your expected number of shares will be slightly over 42."

The client says okay.

The broker then says, "Please take all this information down. You may verify it by calling the company that inspects our Random Number Generator. We're going to use an IBM model FFFFF Random Number Generator, unit no. 433332. It's inspected by ACE Inspections and it was last inspected on Jul. 2, 1990. Ace can be contacted at 202-999-3333. Your purchase number for this bet is 1111112."

"Are you sure you want to bet the $40 to try to win the 100 shares of Blob? If you are, please say to now. I'm going to press a button that activates a recorder to tape the next ten seconds of our conversation. I am doing this to make a record of our mutual acknowledgement of the bet."

The Z in this example must be the kind where the BET (including client name) must be set before the RN can be revealed, where only one RN can be revealed per BET and, where all the information on the transaction is recorded so that an inspection company can review it. Employee cheating is stopped because the BET must be set before the RN is revealed and further because only one RN is revealed per BET. The record stops any employee from trying to make a change.

One way Art can stop his employees from cheating is the following: First, he must know the ID number of Ed's Z in advance. Second, he must require that his employees fully record all transactions. This record is given to an inspection company. The inspection company can then compare Art's transaction record with Ed's. If the company finds a discrepancy in Ed's records then Ed will be revealed. Ed's Z must identify any of Art's bets and must have means for recording all transactions.

The Generation of RN's by Combining Inputs From Both Parties in a Payment

A fair random number can be generated by combining inputs from the two parties in a payment. A direct analogy in a card game is having one player shuffle the cards and the other cut them. Infinitely many operations can combine two inputs fairly. The essential requirement to prevent cheating in this combined inputs method is the following:

Neither party's input supplier can be able to take into account any helpful information about the other party's input.

Hence, a Z requires means for insuring that each party's input supplier is not able to take into account any helpful information about the other party's input.

(We will take "input is revealed" to include "any helpful information about an input is revealed.")
Input Supplier Defined An input supplier is a device that or person who supplies an input.

There are three ways to insure that the parties' inputs suppliers cannot influence each other.

1) The inputs can be revealed simultaneously. This way is rarely feasible so we will not discuss Z's using it.

2) At least one party must provide proof, without revealing its input, that the input is set BEFORE the other party reveals its input. If just one party provides this proof, then the other must reveal its input first or have an input supplier that is physically unable to take into account any information about the first party's input.

3) One or both of the input suppliers can be physically unable to take .into account the others input. If just one party's input supplier is unable, the other party must provide proof that its input is set before the first party's input is revealed. This proof can simply be that the other party reveals its input first.
Two Other Cheats To Be Prevented A Z still requires means for preventing both parties from changing the BEF after the RN is revealed (which in this case means preventing a party from changing the BET after the other party has revealed its input).

A Z must also prevent the RN from being changed. When combining inputs, changing the RN is equivalent to one party taking into account the other party's input. Hence preventing a party from taking into account the others input includes insuring that a party can try only one input.
Preventing Employee Cheating Employees can cheat by informing the other party of their own party's input.

Hence, to prevent employee cheating, a first party requires means for insuring and recording that the other party's input is set before the first party's input is revealed even to the first party's employees and means for insuring and recording that these employees can use only one input per bet and means for insuring and recording that the BET is set before the first party's input is revealed even to its employees.

Of course, both parties could want to prevent employee cheating and thus both would require such means.
COMBINER Defined A device that combines inputs will be called a COMBINER. The combining of inputs need not be controlled by one party's device, in fact it often cannot be. Sometimes it is easier to have a combiner sometimes not. If not, the combining can be done by hand or in the heads of the two parties involved.
Note on the Rest Of Discussion of Combined Input Method Again we call the parties in an EV payment Ed and Art and Ed&Co. and Art&Co. if they have employees. There are 4 generic situations where cheating needs to be prevented. Z's will be described that include means for stopping cheating in these situations.

We will consider two general methods, mentioned above, for preventing cheating when combining inputs:

the first where Ed's input supplier is physically unable to receive any information on Art's input and the second where proof is provided that Ed's input is set BEFORE Art's input is revealed.

1) ED AND ART CAN SEE EACH OTHERS INPUT SUPPLIERS

Input Supplier Is Physically Unable to Use Information About Art's Input

As long as Art can see that Ed's input supplier is of the type that cannot receive any information about Art's input, Art can feel free to reveal his input first. An infinite number of input suppliers can be made that cannot take into account Art's input. For example, Ed can have a bag of numbered chits. It could be agreed that Art would only reveal his input after agreeing to the terms of the bet as recorded on Ed's register or a piece of paper.
Ed Provides Proof Without Revealing His Input. That His Input Is Set Before Art Reveals His Input There are many ways Ed can show that his input is set while concealing that input from Art. The method of concealment must not allow Ed to change his input. There are numerous embodiments of this method and different ones are described in following sections. All apply when Ed and Art can see each others input suppliers. Some are obviously more convenient than others for different situations.

A simple embodiment is for Ed to write his input on a piece of paper and place it face down in front of Art. Art can then write his input on the top side of the piece of paper. The paper can then be turned over to reveal Ed's input. All this can happen after the bet is set on Ed's register.

2) ED&CO.'S INPUT SUPPLIER CAN BE SEEN BY ART WHILE ART'S INPUT SUPPLIER IS VISIBLE TO ED'S. EMPLOYEES BUT NOT ED (This situation is equivalent to An&Co. being in a payment with Ed where Ed's input supplier is visible to Art's employees. The roles are just reversed.)

Ed is concerned about his employees being in cahoots with Art. To repeat a point made earlier, Ed requires means for insuring and recording that Art's input and the bet are set before Ed's input is revealed even to Ed's employees and means for insuring and recording that these employees can use only one input per bet.

Ed's Input Generator Is Unable to Take Into Account Any Information About Art's Input Since Ed must prevent employee cheating, the sequence of when the inputs were revealed must be recorded as well as that there is only one input for each party.

One method is to record the times of revealing, as in the illustration below.

A Z Incorporated Into a Store Register Enabling Customers to Further Randomize a Store's Random Input By Means of a Free Standing Input Device A store has an electronic COMBINER, including a Random Number Generator (RNG), incorporated into its cash register.

The register totals a customer's purchases and then indicates the amount to be bet.

Next to the register, but not electronically connected to it, is a device with which the customer enters a number from 1–2000 (if every purchase is rounded to an integer multiple of $20.00).

This device is electronically separate from the RNG so that the customer's number cannot be communicated to the RNG, thereby preventing the store from cheating.

The separation must be visible to the customer to demonstrate that the customer input device cannot communicate with the RNG.

(A store can still cheat by having the customer input device and the RNG communicate by radio waves or the like. To fully insure that the input device cannot communicate with the RNG, the input device can be non-electronic, for example, simply paper and pencil. After the customer has written a number on a piece of paper, the paper is time stamped with a mechanical stamp that also records a sequence number on the paper so that the customer number can only be added to one store input. The stamp must be over the number to prove that the number has been set before the store's input is revealed.)

The customer input device has a display showing the number entered. The device also has a button that locks in the number. The device also records the number and the time the number was locked in. This record can be in recallable internal memory or on paper tape. Once the customer has locked in a number, the store clerk presses a button on the cash register and the cash register's RNG generates a number from 1–2000. The register records the time this number is revealed.

The reason for recording all these times is to demonstrate that the customer number is set before the store number is generated, thereby preventing customer and employee cheating. The register itself insures that the BET is set before the store number is generated by allowing a store number to be generated only once per purchase and only after the BET is set on the register.

The clerk then looks at the displayed customer number and enters it into the register which then adds it to the store number. The resulting sum determines who wins the bet (2,000 is subtracted from any sum over 2,000.).

Another method for recording the sequence of revealing is to stamp/print an input on top of the other input.

Z Allowing Stamping of One Input on Top of the Other

Art would write his input on a piece of paper. Ed's input supplier would be a mechanical device that would stamp Ed's input upon Art's input. Ed's device would be like a time punch clock in that it would stamp a number, only in this case it would be a random number; the stamper would include a random number generator. The key to this method is that:

1) It establishes the sequence of revealing in that Ed's input is obviously set after Art's since it is on top of Art's.

2) The stamper would not be able to take into account Ares input (unless it had an optical character reader, something easy enough to detect). Art could even be the one to handle the stamper in case he was concerned that the stamper had some kind of means for Ed to influence the input after seeing Ares input.

3) If Ed's employees were using checks or some other receipts for purchases and each receipt was accounted for, Ed's employees could not redo a bet since there could only be one stamp per receipt.

Ed Provides Proof, Without Revealing. His Input, That His Input Is Set Before Art Reveals His Input It is fastest to combine inputs electronically but with the previous methods, the two input devices are necessarily electronically separate. If the method being used is showing proof that Ed's input is set before Art's input is revealed, the following methods and embodiments can be used.

One key method and embodiment is for the Z, controlled by Ed, to generate Ed's input onto a non-electronic medium before Art's input is set. The Z would keep the input in its memory as well to combine with Art's at the appropriate time. This medium is put in plain view of Art (usually by putting the medium in a see through enclosure made of glass, plexiglass, wire mesh or the like) but the input, on the medium, is hidden. The medium may not be in plain view at all times but Art must see it being placed where Art can be sure it cannot be changed (for example, Art could see it being put in an enclosed box). Further, the input must be inaccessible in the enclosure and the enclosure must be tamperproof so that An and Ed's employees cannot check the hidden input prematurely. Then, after Art's input and BET are set on the Z, the Z reveals Ed's input. Below are illustrations of this method and embodiment.

An Electronic, Single Device Z Allowing Customers to Further Randomize a Store's Random Input Before a purchase, a store's microprocessor based register, which has an RNG, generates a number and prints it onto a ticket.

To prevent cheating, it is not possible for the customer or clerk to see this printing process. This number is also stored in memory to be used for the upcoming purchase.

The ticket is spit into a plexiglass covered chute so that only the back of the ticket is showing; the number is printed on the front. The chute has a catch preventing the ticket from falling into a receptacle where the customer can take it. Hence, the customer and clerk cannot see the primed number but can see that it has been set. Further, the chute is tamperproof.

During the purchase, the customer enters, with a keypad on the back of the register, a number to add to the store's already printed number. The customer's number is also stored in memory to be added later to the store's number. The customer then hits a lock-in button on the keypad when his or her number and the BET are set. The register will not reveal the store's number until the BET and the customer's number have been locked-in. Once the lock-in is pressed, the store's number is displayed on the register. The register adds the customer's number and calculates and displays who has won.

The register also releases the ticket to slide down the chute where it can be taken by the customer, thereby assuring the customer that the store number was set before the BET and customer number were set.

Figure 6:
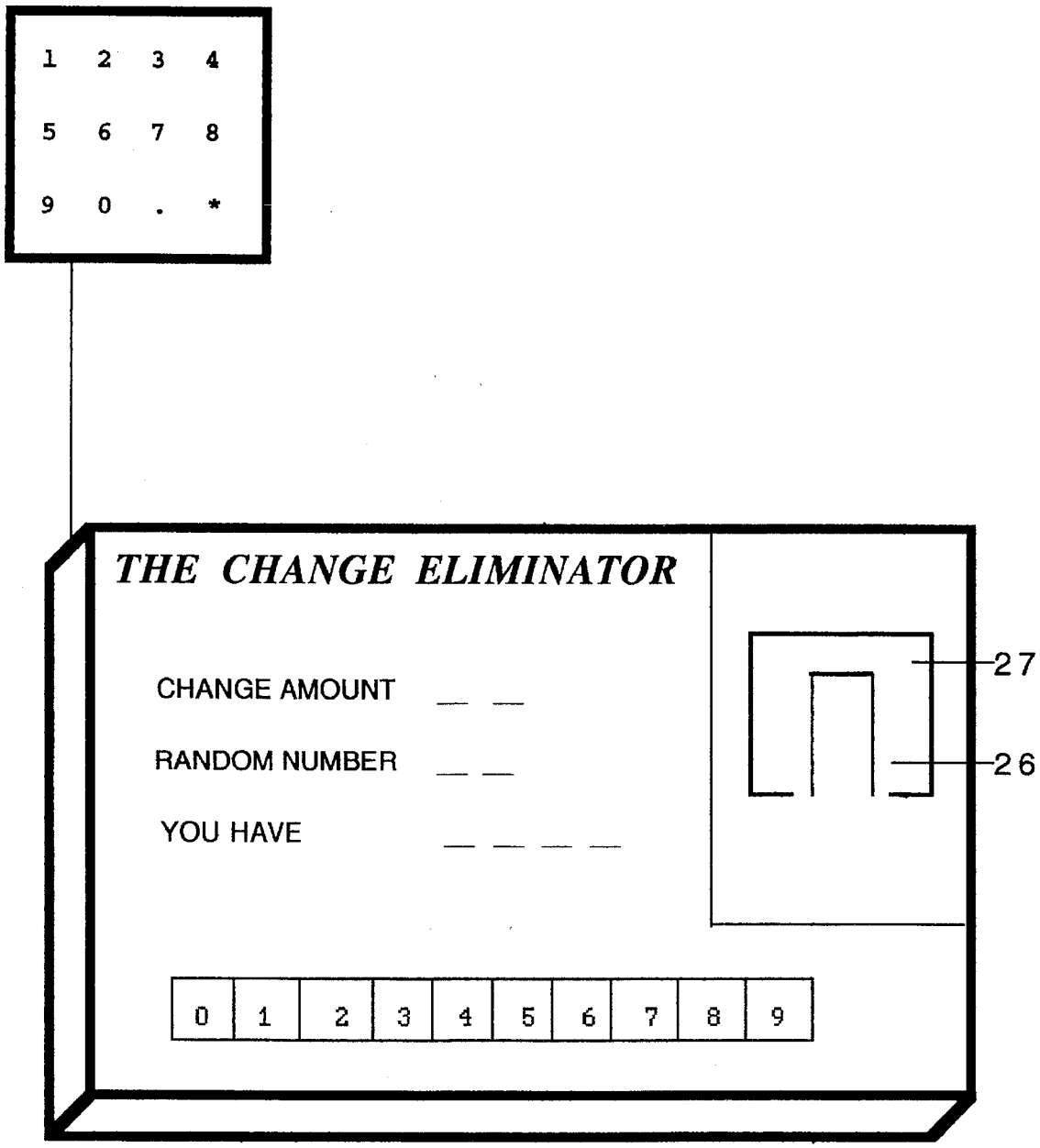
FIG. 6 shows an EVPES for eliminating change and that prevents cheating by allowing the combination of inputs.

FIG. 6 shows a device that works on the same principle. The store input is printed on a paper tape 26. The printing is done inside the device and cannot be seen by anyone. The tape is not retractable so the input cannot be seen that way. The tape is then fed into a plexiglass covered area 27. The input is on the side of the tape that is not visible. Upon a customer input of a number from 1–100, the device adds the customer input to the store input (100 is subtracted from any sum over 100) yields an RN and feeds the tape out of the plexiglass chute where it is torn off and given to the customer. Of course, the tape can also be used to print out the rest of the purchase receipt.

In this method and embodiment, Z's can still, of course, generate inputs mechanically, as the illustration below demonstrates.

Z That Generates an Input Mechanically and Combines Inputs As Well (In the following embodiment, set of RN's is the integers 0–999.) An RNG connected to an electronic register has three sets of 10 small boxes. The boxes all are enclosed in a clear case. Three sets of ten balls fit into these boxes. Each set of a balls is numbered from 0–9.

Each set of balls is randomly placed into a set of boxes from holes underneath the boxes by a mechanism like the one used in state lotteries to pick numbers by blowing numbered balls up into a tube. This mechanism is hidden from view and is underneath the clear case so that customers and clerks can't see the store input.

Once the balls are in the boxes, the boxes are slid backwards to reveal the holes. This action demonstrates that the balls can't be manipulated once they are set in their boxes.

The device also has a set of buttons, 0–9, for a customer to indicate the one box in each set he or she wants to select (buttons can be repeated). The device also has a button for the customer to lock-in the BET, which is showing on the register, and his or her selection, which has just been made. When the BET and the customer's selection are locked-in, all the boxes are lifted showing that all thirty balls were present so as to prove to the customer that a fair set of numbers is selected from. The numbers of the three balls the customer selected are then read by a scanner and the numbers are recorded. With three balls, any number from 0–999 can potentially be selected. All the balls are then returned to the randomizing mechanism. The customer can be sure that the selection is not rigged because the customer is doing the selecting.

As for stopping the customer from cheating, the RNG will not lift the boxes until the BET is locked-in. Further, the RN is recorded on a register tape along with the BET so that the RN cannot be changed or used for another BET.

In the previous three illustrations, Ed's input was visible to Art at all times so Ed could not change the input. It is possible to have the input out of Art's sight for a time but, if that is the case, Art must be able to mark the input somehow so that he can be sure that Ed has not changed it. Further, the input must not be revealed to Art or Ed's employee before Art has revealed his input. A solution follows, using the example of a restaurant.

Z Using Marked Lottery Type Ticket To Show Input Is Committed To

A restaurant's input could be hidden in a scratch-off ticket. The ticket would be part of a restaurant check. The check would have room for a customer to write his input and further to sign the check the signing of the check would set the bet and the input and further it would mark the check so that Ed could not change it in any way. Ed's input would remain concealed. Ed's employee, the waiter, would be prevented in the following way from revealing Ed's input to Art. Ed's register would include an optical character reader. The waiter would have to insert the check into the register which would scan to see that the scratch off material had not been removed. The waiter would then enter Art's input and the full bet information into the register. The register would remove the scratch off material and read the underlying input and combine the inputs. The register would record the whole transaction and the check would be a record as well.

Two other methods of showing proof that Ed's input is set before Art's is revealed are using encrypted inputs and pre-registered inputs. These methods are described in the sections below describing the cases where Ed and Art cannot see each others input suppliers.

(When Ed&Co. and Art&Co. are in an EV payment, whether or not one or both partys' employees can see the opposing party's input supplier, Ed and Art cannot see each others input suppliers because the payment is being handled by the employees. We deal first with the situation where Ed and Art can't see each others input suppliers, say when a sale is done over the phone, and deal with employee complications after.)

3) ED AND ART CAN'T SEE EACH OTHERS INPUT SUPPLIERS

Ed must provide some non-visual proof that he has set an input without knowing anything about Art's input. If Art gets this proof, Art can then reveal his input to Ed. It is just as reasonable though to have Art give Ed some proof that Art has set his input without knowing anything about Ed's input. Ed can then reveal his input to Art. Art and Ed are in the same position.

The proof that must be provided is simply proof that a party's input is set BEFORE that party has any knowledge of the other party's input. A Z therefore requires means for providing this proof.

There are two non-visual methods for providing this proof. The first way is to have a party register its input with a neutral party at a given time. This time can then be verified later. The first party gives the second party an ID number that corresponds to the pre-registered input and the name of the neutral party the input is registered with so that the second party can check the input. If only one party does this, the other party is the first to reveal its input. After the first party reveals its input, the second party gives the first party an access number so that the first party can verify the pre-registered input. This extra access number may be necessary to prevent the first party from checking the pre-registered number before the first party gives its input. The neutral party only releases the pre-registered input after first getting the access code.

The second method is to have a party give its input in code. If only one party encodes its input then the other party reveals its input first after which the encoded input is revealed by revealing the key to the code. If an input is encoded, the code must code for only one input.

4) ED AND ART BOTH CANNOT SEE EACH OTHERS INPUT SUPPLIERS AND ED'S AND/OR ART'S EMPLOYEES ARE INVOLVED

Whenever the input suppliers are not visible to both parties, then pre-registered inputs or encoded inputs are needed. When both Ed and Art cannot see each others input suppliers and Ed cannot see Art's supplier because Ed's employees are handling the bet then Ed requires means for insuring and recording that Art's input is set before Ed's input is revealed even to Ed's employees and means for insuring and recording that these employees can use only one input per bet.

Of course, both can require such means if both are using employees.

Such means would record the terms of the bet and the other party's encoded input or pre-registered input. The device would then release:

a) a random input generated by the device itself or b) the key to the encoded input being used or c) the access number to the pre-registered input being used.

The key is to keep the input secret from employees until the other party's input and the terms of the bet are set. The devices would only release one input per bet of course.

Illustrations

Assume an investor is buying stocks over the phone through his broker. The investor and the broker agree that there will be a bet. Assume further that the brokerage is on one side of the bet. The broker says to the investor, "To arrive at a number that will decide the bet, we're both going to supply a number and add them. The way we'll do this is the following:

I'm going to tell you a BET ID number. This number corresponds to the number we will supply for this bet. The number we will supply is in our computer.

The computer will only release our number after you have supplied your number.

I don't know what our number is until the computer releases it.

You can be sure that we will not change our number in response to your number because we have pre-registered the BET ID number and the number it corresponds to with a neutral company. After the bet takes place, you can call this company to verify which number the BET ID number corresponds to. The neutral company is called BET WITNESSES, Inc. and can be contacted at 202-999-8888.

Now, our BET ID number is 1314156. If you are sure of the bet, I will patch you into our voice recording system. You must repeat the BET we have agreed to and then tell the number you want to use in the bet.

I will then enter your number into our computer which will release our number. It will then add our number and your number and announce who has won the bet.

The whole transaction will be recorded and confirmation will be sent to you.

The computer will also release an access code which you can use to contact BET WITNESSES, Inc.. If you give them the access code, they will verify the number that the BET ID number corresponds to."

If the investor is part of an organization, the organization can stop him or her from cheating in cahoots with the broker by making the investor enter the following data into a separate Random Number Supplier, controlled by the organization: the BET, the BET ID number, and the name of the neutral, witness company.

Once this data is set, the organization's RNS supplies a number which is the input to be used in the bet.

The organization's RNS records all this data and the RN it has supplied (it is made to only supply one RN per bet). Hence, the investor cannot allow the broker to change the bet's RN.

A method, using codes rather than pre-registered numbers, is as follows.

Assume an investor is buying stocks over the phone through his broker. The investor and the broker agree that there will be a bet. Assume further that the brokerage is on one side of the bet. The broker says to the investor, "To arrive at a number that will decide the bet, we're both going to supply a number and add them. The way we'll do this is the following:

I'm going to tell you our number but the number will be in code. Our computer will release the key to the code after you have supplied your number. You can be sure that we can't change our number because our code uniquely codes one number. I will give you a very large number. It is the product of two prime numbers. Our input is the larger of the two primes. You will not be able to decode the number quickly but after you have given us your input, we will obviously give you our number. You can verify it if you like afterwards.

Now, the large number is_____. If you are sure of the bet, I will patch you into our voice recording system. You must repeat the BET we have agreed to and then tell the number you want to use in the bet. I will then enter your number into our computer which will release our number. It will then add our number and your number and announce who has won the bet. The whole transaction will be recorded and confirmation will be sent to you."

If the investor is part of an organization, the organization can stop him or her from cheating in cahoots with the broker by making the investor enter the following data into a separate Random Number Supplier, controlled by the organization: the BET and the broker's encoded input.

Once this data is set, the organization's RNS supplies a number which is the input to be used in the bet.

The organization's RNS records all this data and the RN it has generated (the RNS is made to supply only one RN per bet). Hence, the investor cannot allow the broker to change the bet's RN.

Z's Using Verifiably Independently Determined Random Numbers (IDRN's)

"Independently Generated Random Number" (IGRN) Defined

An Independently Generated Random Number is an RN that is generated by an independent (neutral) party.

Either party in the payment or the the independent party can dispense an IGRN.

"Inputter" Defined

Regardless of how it is dispensed, if a number is independently generated, there must be some event—we will call it an input—that causes the number to be supplied in a given bet. For instance, an input may simply be a request, "Please generate a number for us now."

We will call the party that determines the input or input procedure the Inputter. (If both parties decide on an input procedure where neither can be said to determine the input, both can be considered Inputters).

"Independently Determined Random Number" (IDRN) Defined

An IDRN Is an RN That Satisfies Two Conditions:
1) An independent party must generate the RN.
2) The RN is supplied in response to an input determined by one of the parties in a payment bet and this party, called the Inputter, must be able to try only one input and have no knowledge of what RN will result from the input.

Note: One might say that an IDRN is an RN that comes from combining the input of one of the parties in a bet with the input of a neutral party.

Verifiably Independently Determine Random Number" (VIDRN) Defined

The purpose of an IDRN is to assure that the RN used in a bet is fair. An IDRN cannot do this if there is no evidence that the RN is independently determined. The IDRN must be verifiably an IDRN. So a verifiably independently determined random number (VIDRN) is an IDRN supplied together with evidence that it is an IDRN.

RNS Defined When Using VIDRN's

The RNS is what supplies the VIDRN's.

Control of the RNS Defined

A party is said to control the RNS if the party informs the other party of the IDRN. The other party can of course check later with the source of the IDRN to see if the number is an IDRN. If the source of the IDRN informs both parties of the IDRN then neither party controls the RNS.

Means and Methods Required in a Z Using VIDRN's

Given that evidence is necessary to verify that IDRN's are indeed IDRN's, a Z using VIDRN's requires:

means and methods for demonstrating (verifying) that an RN is generated by an independent party.

Means and Methods Needed To Fully Prevent Cheating Using VIDRN's (Including Means and Methods For Setting Bets Properly)

VIDRN's insure that the numbers used to decide bets are fair. Still, a Z using VIDRN's must insure that neither party can cheat by changing the BET after the VIDRN has been revealed. Hence, a Z using VIDRN's requires:

A) means and methods for demonstrating (verifying) that an RN is generated by an independent party and B) means and methods for demonstrating (verifying) that the Inputter can only try one input and have no knowledge of what RN the input will result in and C) means and methods for insuring that the BET is set before the RN is revealed.

Means and Methods "A", "B", and "C" Explained In More Detail

The means and methods of "A" are simply information that allows either party to verify that the RN used in a bet was generated by an independent party and that the RN was supposed to correspond to that bet. For example, this information could be the telephone number of the independent company, the ID number of the RNS that dispensed the RN and the input number for that bet. With this information, a person could call the independent company and say, I had a bet at RNS no. _____ with input number _____ and the RN was _____. Is that the correct RN corresponding to that RNS and that input? The company can then say yes or no.

Three types of means and methods fall under "B":

x) means for verifying that the input is committed to BEFORE the Inputter can have any knowledge of what RN the input will result in. For example, the Inputter, Jim, can agree on Sept. 12 that a BET with Slim will be decided by an RN generated by Rob's Random Number Generators, Inc. on Sept. 13. The Inputter can have no knowledge therefore of the RN.

y) means for demonstrating that the Inputter physically cannot check what RN will result from a given input. For example, the Inputter may be a customer in a store and the RNS may be owned by the store. Thus the Inputter cannot know what RN will result from a given input.

z) means for making an RN, if checked by the Inputter before being revealed to the other party, show evidence of having been checked before being revealed to the other party. ("Check" refers to linding out any helpful information about what the RN will result from an input.) For example, when the result of a scratch off lottery ticket has been revealed there is, of course, evidence that the result has been checked.

Two basic means and methods fall under "C": Means for insuring that RNS will not respond to an input until the BET is set or means for recording that the BET is set BEFORE the RN is revealed.

Note: An RNS that dispenses VIDRN's can be made tamperproof. Making it so provides a little more protection over making an ordinary RNS tamperproof because the cheating would be restricted to tampering with the selection of IGRN's. The source of the numbers can still be verified though their selection might be rigged.

Means and Methods For Using VIDRN's in Given Situations

We have described the three means and methods CA", "B" and "C") needed to prevent cheating by using VIDRN's. Now we look at the generic situations listed below where VIDRN's can be used. The RNS is Stand-alone, not connected to the source of the IGRN's. The RNS is connected to the source of the IGRN's. The RNS is visible to the Inputter. The RNS is not visible to the Inputter. One of the parties is using employees. Both of the parties are using employees.

It may be that neither party controls the RNS but that a neutral party informs both parties of the VIDRN. In all other cases, we assume that one party, Ed, controls the RNS and that the other party is Art (if Ed controls the RNS, Art must, of course, be sure that Ed cannot influence the selection of the RN's.).

1) Ed's Stand-alone RNS Is Visible to Art

If Ed controls the RNS and it is stand-alone, there are two basic ways to dispense VIDRN's.

IGRN's Concealed By Removable Medium That Shows Evidence of Removal

Ed's RNS can dispense IGRN's concealed by a removable medium. The medium must not be replaceable if removed. An example is the scratch-off material on a scratch-off lottery ticket. Evidence of the medium being removed is of course evidence that the IGRN has been checked. The use of physically concealed IGRN's is illustrated below.

IGRN's Printed Inside Sealed Paper Packets

IGRN's can be printed inside sealed packets of paper like those used by fast food restaurants in prize contests. When torn open, these packets reveal an RN. A store's register dispenses these and a customer opens them to reveal the RN.

To prevent employees from being in cahoots with the customer: Before being dispensed, such packets have to be stamped inside the register with a purchase number and a time to verify that only one has been dispensed per bet and that they have been opened after the BET is set. The stamping mechanism must be tamper-proof.

A store can find out an RN by tearing open a packet but then that packet cannot be used for a purchase. Since the store could open an advantageous RN just as easily as a disadvantageous one, there is no profit in checking an IGRN inside a sealed packet. Hence, such an RN is an IDRN.

To prevent counterfeiting, the packets have to be printed in some non-duplicatable way. Counterfeiting can be inspected if customers are randomly encouraged to send in packets for testing by an independent company.

Stand-alone, Programmed RNS Loaded With Recorded IGRN's

The second way to dispense VIDRN's with a stand-alone RNS is to make the RNS programmable and load it with an algorithm or algorithms that act on inputs to yield RN's. The algorithm or algorithms are kept secret and recorded by the manufacturer of the RNS who can verify whether an RN is an IDRN.

If Ed controls the RNS, it is possible for him to tamper with it and learn the stored algorithm(s). Thus Ed cannot be the Inputter; Art must be. Art is physically prevented from knowing the algorithm(s) because Ed controls the RNS.

Several ways Art can control the input are described in the embodiments that follow.

In all the embodiments, Art must be able to verify that the IGRN's are IDRN's, yet in doing so he must be prevented from finding out an RN before the bet is set. Hence, Ed requires means for stopping Art from checking the RN in advance of a bet. There are two different means for doing so. One, the RNS supplies an access code along with the RN, the code being necessary to give to the verifying company. Two, the bet can be set at a time that is before the verifying company will release any information about the RN.

VIDRN's Dispensed by an RNS With Internally Stored Algorithms That Act on an Input and Purchase Number Using internally stored algorithms, an RNS can generate RN's which vary according to an input and purchase number.

A cash register's RNS can come fully loaded with algorithms that correspond to purchase numbers as shown:

Purchase 1—Algorithm 884

Purchase 2—Algorithm 6

Purchase 3—Algorithm 94 . . .

The algorithms act on the customer input to generate an RN. An algorithm can simply add a number to the customer number; it can be as simple as: RN=x+customer input; if RN>Y, RN=RN−Y (where RN, the customer input and the independent input can be from 1 through Y).

The order of the algorithms is randomly set by the manufacturer who also records the order so that verification of RN's can take place. Purchase numbers are needed so that if an input is -reused it does not automatically yield the same RN, a situation that would allow customers to cheat.

The order of algorithms varies from register to register so customers cannot extrapolate from one register to the next.

After the BET is set on the ,register, the customer enters an input on a keypad connected to the register.

The customer then presses a lock-in button on the keypad to set the BET and his or her input, Upon the pressing of the lock-in button, the RNS supplies an RN based on the purchase number and the customer input. The store cannot exercise control over the selection because it cannot affect the customer input.

The current purchase number is shown on a display on the register at all times so that the customer can see it, thereby preventing the store from changing it unfairly during a purchase.

(The functions of the lock-in button and of displaying purchase numbers can be accomplished by other means, for example, pen and paper. Pen and paper can be useful, for example, in a restaurant. A waiter can present a check that includes the purchase number, the amount to be bet and the RNS ID information. The customer can sign the check to acknowledge these terms and also write down an input. The waiter can then enter this input into the RNS and return with a result.)

The customer's receipt includes the register number along with the purchase number and the customer's input number so that the customer can call the manufacturer of the register to verify that the proper RN has been dispensed.

In addition m these numbers, an access code is included. A single access code is assigned, by the company that determines the algorithms, to each purchase number. This code is, of course, not knowable until the RN is revealed since the code is revealed along with the RN. The customer must have this access code in order to verify the RN. Otherwise, the customer could find out the RN before the BET was set, thereby cheating.

An alternative to having the customer enter an input that has no special significance is to have the customer enter an input that is a time. The RNS algorithm or algorithms would act on this time. The customer would have to input a time that was after the time the purchase bet was being made. And the manufacturer would only verify an RN at a time after the time inputted. The customer would then be prevented from checking in advance what RN an input corresponded to. The date can be automatically part of the input or there could be no date meaning the Inputter could only verify a number on the day a purchase is made.

Inputting Linked to a Natural Process

Having a customer enter an input takes time so it may be better to have the inputting done automatically by the RNS. Yet since Ed controls the RNS, he could cheat. A solution is to have the inputting linked to a natural process Ed cannot affect. The problem is that the linking itself gives Ed the chance to cheat. The solution is to enable Art to inspect the inputting process and to control the input at those times when Ed might be able to cheat. Art controls the input through his inspection and optional intervention. Two illustrations are given below, one where the method used is the flow of time and the other where it is the flow of customers.

Inputting Based on the Flow of Time

Figure 7:
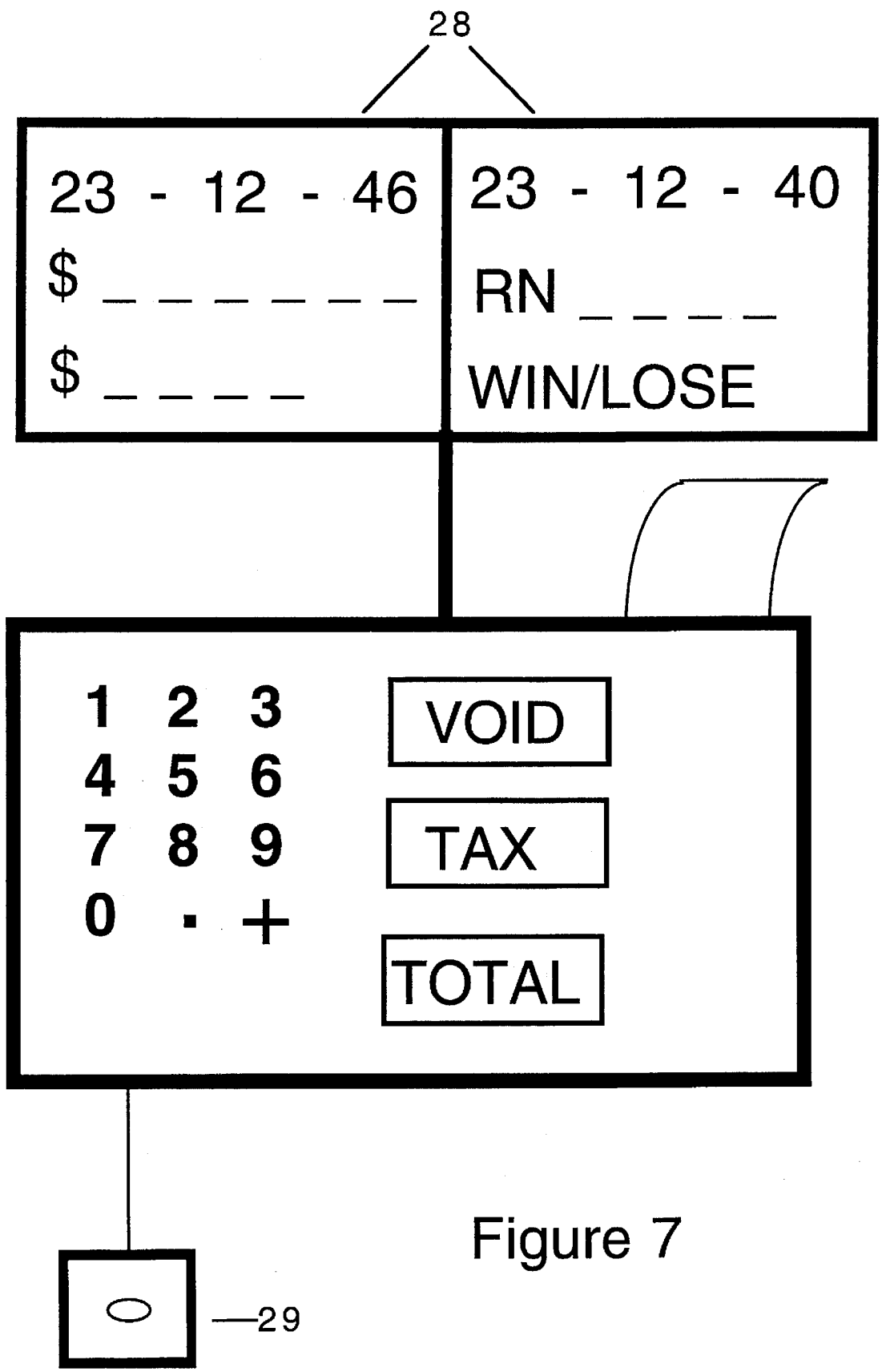
FIG. 7 shows and EVPES incorporated into a cash register and that prevents cheating by insuring and a random number comes from an independent party.

As in FIG. 7, a cash register displays two digital clocks 28 next to each other. The first clock runs continuously. The second is synchronized with the first but registers time in ten second intervals so that when the first is showing, for example, 23-12-46, the second is showing 23-12-40. The clocks are tamperproof.

The second clock's display is frozen when a customer presses a lock-in button for acknowledging the bet and for setting the input. The date (not showing) and the time (showing) on the frozen clock is used by the RNS as the input. The reason to allow the customer to freeze the clock in ten second intervals is that it prevents any arguments about whether Ed is influencing when the time is frozen. Ed cannot affect the flow of time yet he can possibly affect which second is input if the intervals are seconds. Making the clock run in ten second intervals lets Art control the time inputted. The first clock is not absolutely necessary but makes it easy tier Art to see when a ten second interval is going to advance so he can be sure what interval he is inputting.

Upon the pressing of the lock-in button, the RN is revealed. Five seconds later, the second clock unfreezes and displays again a time synchronized with the first clock. The verifying company will only verify the RN at a time after the purchase is made.

Inputting Based On the Flow of Customers

A cash register displays a purchase number for each purchase. The purchase numbers are consecutive integers. The purchase number is the input used by the RNS.

If Ed has tampered with the RNS, he can still influence the RN's by checking purchase numbers and skipping losing ones. This is hard to do because the purchase numbers are displayed and he can only do it when customers aren't watching the display. Still, it is possible. To prevent this, a customer has a keypad that he or she can optionally use to advance the purchase number whatever amount he or she wants. Thus, if there is any doubt that Ed has cheated, the customer can nullify this cheat.

(Another, less practical, thing to do is to record the customers who made purchases. If a person thinks that a purchase number has been skipped he or she can request to see the record of the previous purchase. This record can be the previous customer's signature or a video/audio audio tape of him or her.)

A simpler method can be used if employees do not cheat for owners. If purchase numbers are displayed, the RNS cannot skip numbers because store clerks will see the skipping. Displayed purchase numbers alone are therefore adequate as inputs. Though less simple, time can also be used as an input where the interval is determined by employees as long as the increments are large enough so that employees are sure to have input one interval and not another. With long enough intervals and clerks knowing to input somewhere in the middle of intervals, arguments should not arise.

2) Ed's RNS Visible to Art, Connected to the Source of the IGRN's

Ed's RNS can be connected to the source of the IGRN's in two ways, electronically and by mail.

All the means for preventing cheating in stand-alone RNS's apply to connected RNS's (though physically sealed IGRN's are not necessary).

In addition, there are two other ways to prevent cheating. One is to set the input at a time that is before the source of the IGRN's will release the RN. The other is to have the source keep a record of when anyone has checked an input.

As will be seen in various embodiments, connecting the RNS to the source of the IGRN's enables Art to more simply control the inputting because it's possible to have the source only generate one RN per purchase and to have the source record whenever an RN has been checked, thereby denying Ed the chance to influence inputs or request multiple inputs.

As before in the case of stand-alone RNS's Ed must be sure that Art cannot check an RN before a bet is set. Means for stopping Art from doing so are the same as with stand-alone RNS's, namely, the RNS can supply an access code along with the RN, or the bet can be set at a time that is before the verifying company will release any information about the RN. And, there is an additional means possible; the verifying company can record when an input has been checked.

IDRN's Based on Time and, Purchase Number Inputs And Determined BY An Independently Controlled Computer An independent company can generate RN's on a central computer connected to the RNS on a store's register. When a BET is set, the store's register requests an RN from the central computer.

The RN then sent includes verification numbers as shown:
RN_____, Register No._____, Time_____, Date_____.

The register display includes a digital clock which shows the hour, minute and seconds. The RN is based on what this clock is showing at the time of the RNS's request for the RN. The clock is displayed so that the customer can verify almost exactly the time that the RNS request is made.

Almost exactly is not enough however. The store can still potentially influence the selection of the number. For example, the store's register can be rigged to request multiple RN's and reveal only a winning one to the customer. Several RN's can potentially be requested in the space of a second or a few seconds.

To prevent such manipulation, a purchase number is included along with the other numbers. (If the RN depended only upon a purchase number and not the time as well, the RNS could check the RN that corresponded to a given purchase number and skip the RN if it was disadvantageous.)

In addition, the register display, clearly visible to customers, shows the current purchase number so that the store cannot change it during a purchase. The final step in stopping store manipulation is taken by the central computer. It only supplies one RN per purchase number per day per register. Therefore, upon detecting a losing number, the register cannot request another RN for that purchase number. And since the RN depends on the time as well, the store gains no advantage by skipping a purchase number while the customer is absent. Hence, the store cannot influence the selection of the RN.

The store's receipt includes the verification company's telephone number so the customer can verify the fairness of the RN.

Source of the IGRN's Supplies Only One RN According to Identity of the Bettor and the Time of Purchase Assume that a customer is purchasing a book from a bookstore that has an electronic funds transfer (EFt) machine that gives customers the option to make an EV payment.

If the customer agrees to bet, the bet is decided in the following way (assuming the EFT works as is described).

The person puts his or her debit card into the store's EFT machine. He or she presses a button on the EFF machine to acknowledge the terms of the bet.

The customers credit is electronically checked by a central computer before funds are transferred. Right after a person's credit is verified, up to an amount that can cover a loss in the bet, the central computer generates an RN and decides the bet. The EFT machine in the store is then notified that the customer has won or lost.

If the customer has lost, he or she will want to be able to verify that the RN was fair. The receipt therefore includes the telephone number of the company that has provided the RN.

The customer can call this company, which it is established is neutral in all bets, and verify the number generated and verify that it was the only one generated at that store, for that customer, for that purchase, at the given time. The verifying company will only give out the information after the time of the purchase.

Source of the IGRN's Records Bets According to Identity of the Bettor and the Time of Purchase The same scenario as above holds but the source of the IDRN's can simply record to who and when an RN was given out. It does not matter if only one RN is given out because a customer can call and ask how many RN's were requested for that customer. A variation of this idea follows just below.

Source Supplies Evidence of When a Purchase Number Input Is Checked

A cash register has an RNS connected to a central computer. The register includes a display showing the time and current purchase number. The clock is synchronized with the time kept by the central computer. The input for the bet is simply the purchase number shown. The central computer makes it impractical for Ed to try to check and then skip an unfavorable RN because the central computer keeps a record of when purchase numbers have been checked. Ed's problem is that if he checks an input and finds it favorable HE MUST SKIP that number because a customer can find out that Ed has checked the number before the purchase. The customer will know when the purchase takes place because of the displayed clock. The point is that it Ed gains nothing from checking a number because whether he finds a favorable number or an unfavorable one, he must discard both (just as with a scratch-off lotto ticket).

The central computer also tells Ed if anyone has checked the input before the purchase which stops Art from doing so.

Source Supplies an RN Based on Time Input That Is Set Before Bet Is Set

An electronic cash register with an RNS connected to a central computer displays a clock The clock is synchronized with the clock of the central computer. When a customer passes a sensor, the register clock freezes. The RNS requests an RN from the central computer and the central computer waits and supplies an RN based on a time 10 seconds after the frozen time. The point is that Ed has no way to check the RN in advance of the purchase. The RN is not revealed to the customer until the bet is set by a lock-in button. After the RN is revealed, the clock again becomes synchronized with the central computer clock ready for the next customer. The verifying company only verifies after the time of the purchase.

3) Ed's Stand-alone RNS Is Not Visible to Art
4) Ed's RNS Connected to the Source Not Visible to Art These two situations are discussed together because the main issues are the same. Basically, when Art can see Ed's RNS, Ed can provide visual evidence that the RN is fair. This visual evidence, explained in previous sections, obviously cannot be used if the RNS is not visible (An exception of sorts is the use of time based inputs. In previous sections these were posted for An to see. It is possible for Ed and Art to synchronize clocks relative to a third, neutral clock, and thereby still use time based inputs. Yet, that is usually unnecessary. Time based inputs were used to make inputting more automatic. Yet it gets more complicated to synchronize clocks than simply to have Art supply an input.) In previous sections, many methods were given to make An's inputting a bit easier. These cannot be used when Art cannot see Ed's RNS. Yet the simple method of Art supplying an input still holds (of course, Art only does this after having all the terms of the bet set including the I.D. no. of the RNS).

If Ed's RNS is stand-alone, the method for Art's verifying the IDRN is the access number method previously described. If Ed's RNS is connected to the source of the RN's, verification can be by the access method or the time method, also previously discussed.

In addition, if Ed's RNS is connected to the source of the RN's and the source records the full bet transaction, Art can simply verify by checking with the source to see whether the RN was previously checked and whether it was unique to that particular bet. Art does not need to supply an input in addition to the bet information itself, which is actually the input in this case.

Also as explained previously, when the parties cannot see each other they may require recording means for verifying that bet terms are properly set. To repeat from earlier discussions, audio tape and digital signatures are two possibilities.

5) Preventing Employee Cheating When IDRN'S Are Used

Let us look at the possibilities for cheating.

Ed has employees, they can cheat, in cahoots with Art, by telling Art which input will be favorable to Art (which the employees might be able to know without actually trying an input), by allowing Art to change his input, i.e. by re-doing a BET until a favorable input is found and by allowing Art to change the BET.

Now, if Art has employees, they can cheat, in cahoots with Ed, by allowing Ed to change the input and by allowing Ed to change the BET.

In other words, we still have the three basic cheats:

An unfair RN can be selected in the first place, the RN can be changed and the BET can be changed.

If neither party controls the RNS, we have two out of the three basic cheats to prevent. In this case, if the employee is the Inputter, he or she can allow the other party to change the bet or change the input. If the employee is not the Inputter, he or she can allow the Inputter to change the input or the BET. (An unfair RN cannot be selected in the first place because neither party can know in advance (it is presumed) what inputs are favorable, a possibility if one party controls the RNS that dispenses the IDRN's.)

In other words, a Z still requires means for insuring that the Inputter can't have any knowledge of which RN will result from an input and that there is only one input (and hence one RN) per bet.

Hence, if an employee is not trusted and that employee is in a position to allow or help the other party to cheat, a Z requires tamperproof means for insuring and recording that the input and BET are committed to at a time BEFORE the suspect employee can have and knowledge of which RN will result from the input. tamperproof means for insuring and recording that there can only be one input per bet and that no knowledge of this input is revealed to the suspect employee until alter the BET is set.

Embodiments of these means have been shown in situations where Ed's RNS, operated by Ed's employees, is visible to Art. Now we deal with situations where Ed's RNS operated by Ed's employees is not visible to Art and also with the situation where both Ed and Art have employees.

Embodiments

Committing and Recording Bet Before the IDRN Can Be Known

Illustration

Assume An suspects his employees of being in cahoots with other companies. To stop his own employees from cheating, he makes the following policy:

1) All bets are to be decided by a company called, Neutral Number Generators, Inc.. (Art knows that this company keeps its RN generation secure and that it documents the time and date that it generates a given RN and documents who it releases the RN to. Further, the company only generates one RN per bet.)

2) All bets are to be decided by numbers that are generated the day after a bet is set.

3) All bets are to be unerasably recorded on a register which records the time that the bet terms are set. These terms include a bet ID number which is given to Neutral Number Generators, Inc. Hence, the bet and input are committed to at a time that is verifiably BEFORE any person involved in the payment can have any knowledge of which RN the input will result in. And because the bet has been recorded, it cannot be re-done in an attempt to get a better result.

Recording of All Bet Terms By Central Computer That Supplies IDRN

One way this can be done is for Ed to require that all bets are to be made through a given central computer. The computer would record all terms of a bet and supply the RN only afterward. A record of all bets would then be available to Ed to check on his employees. Of course, both Art and Ed could use the same central computer to prevent employee cheating.

Where a Stand-alone RNS is Used By One Party While Insuring and Recording That Them Can Be Only One Input Per Bet and That No Knowledge of This Input Is Revealed to an Employee Until After the Bet Is Set If a stand-alone RNS is being used and if both parties have employees, one party requires a random input generator that can record all the terms of a bet and release a random input after recording those terms. The following illustration demonstrates.

Illustration

Assume the following:

Two companies, Ed&Co. and Art&Co., are involved in a BET. Ed's and Art's employees are handling the BET. And, Ed and Art do not trust their employees.

The Z in this case includes an RNS, controlled by Ed, and a Random Input Generator (RIG), controlled by Art.

Ed's RNS is of the type such that the RN's are determined by verifiable, internally stored algorithms tied to purchase numbers and acting on customer inputs. The RNS also dispenses a secret access code with each RN, for purposes of verifying the RN.

Art's RIG is a normal type random number generator (it does not dispense verifiably independently generated numbers) that is tamperproof. The RIG can dispense enough different numbers so that knowing all the possible numbers would be of no help to a person. The RIG is also a recording device that can fully record the BET transaction.

The payment is executed over the phone therefore, Ed's RNS is not visible to Art's employee (the situation is equivalent though to the RNS being visible to Art's employee but not Art).

Figure 8:
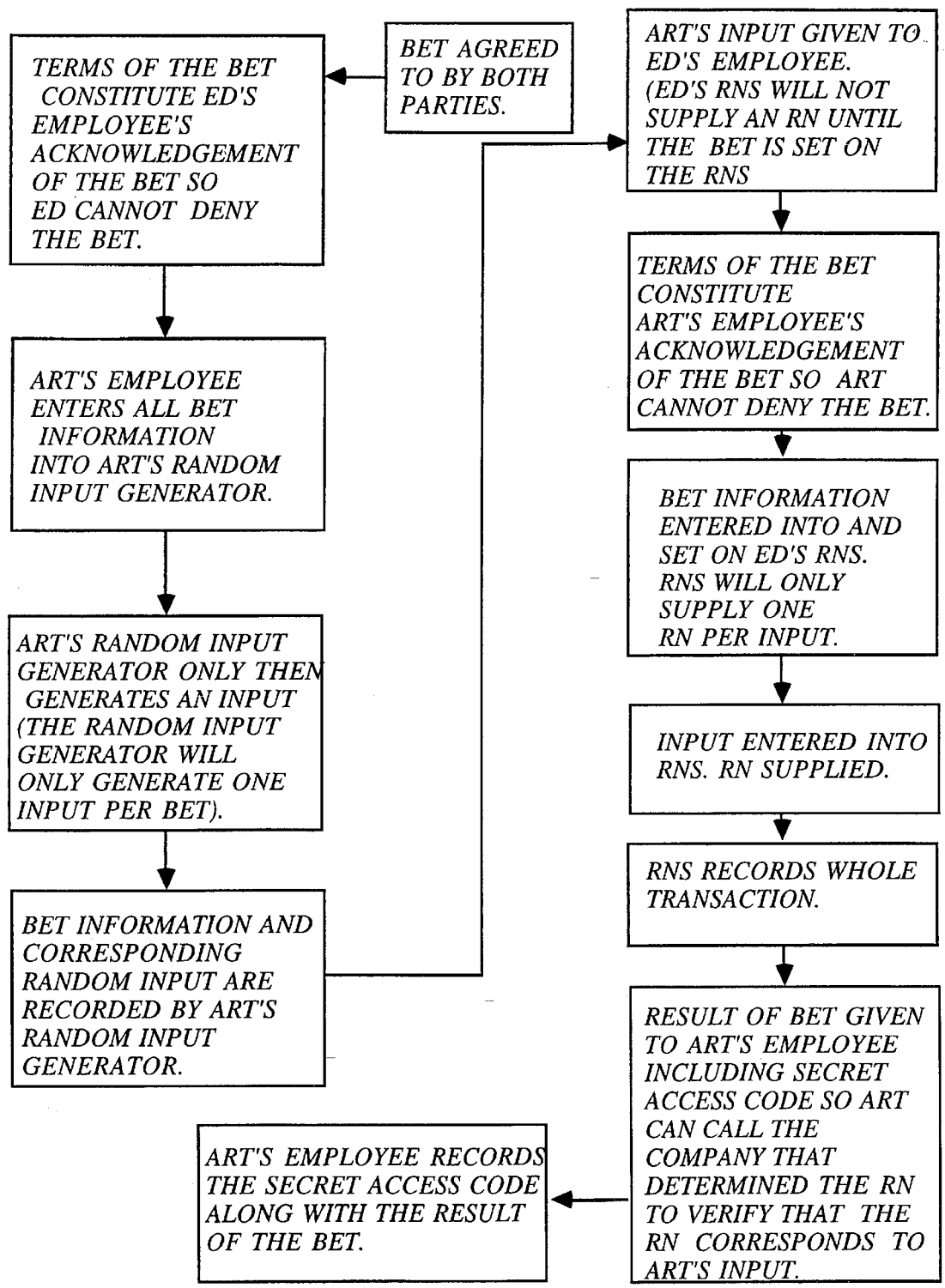
FIG. 8 shows a schematic explanation of an expected value payment between two organizations using Verifiably Independently Determined Random Numbers.

Given the assumptions above, the payment BET is executed in the way described below (see also the flowchart in FIG. 8):

1) Ed's and Art's employees agree to the terms of a BET which include:

a) What can be won and lost in the BET and by whom, b) What is paid for the chance of winning, c) the odds (the numbers that will win for each party), d) the ID# and manufacturer of the RNS to be used, e) the ID# and manufacturer of the RIG to be used, f) the purchase number of the BET.

2) Art's employee requires proof that Ed's employee has agreed to the terms so that if Ed loses the BET, Ed cannot try to claim the BET was different.

If, as we are assuming, Ed's RNS only supplies one RN per input, only supplies an RN after the BET is set and, records the whole transaction and, Art's RIG only supplies one input per bet, only supplies an input after the BET is set and, records the whole transaction. and if Ed tries to claim that the BET was different, he will be prevented because (this gets complicated): The terms of the BET include Art's RIG and Ed's RNS ID information, which is recorded by Ed's RNS and Art's RIG.

Now, since Ed's RNS must have Art's RIG ID information entered before it supplies an RN, Art can demand to see Ed's RNS transaction record.

This record must reveal Art's RIG ID#.

Art can then say to Ed, "You acknowledged my RIG before the RN was supplied. Look at my RIG's transaction record and you will find the terms of the BET."

Ed can't deny this unless the claims that Art has tampered with or counterfeited his RIG. If Ed really thinks this is so, Ed can have the RIG inspected.

Hence, the terms of the BET, along with the proper RNS and RIG, constitute acknowledgement of the BET that can't be denied later by either party.

3) Art's employee enters the terms of the BET into Art's RIG.

4) The RIG only supplies one input per BET and only supplies an input after the BET terms have been set. A button is pressed when the BET terms are set and an input, a random number, is generated.

5) The RIG, records the above information.

6) Art's employee gives the input to Ed's employee. (The RNS only supplies an RN after the BET terms have been set.)

7) Ed's employee requires proof that Art's employee has acknowledged the BET. This proof is the same as in #2 above, with the roles reversed.

8) The RNS only supplies one RN per BET. Ed's employee enters the BET terms into the RNS.

9) Art's Input is entered into the RNS; an RN is supplied.

10) The RNS records all the above information.

11) The RN, the result of the BET is given to Art's employee. Along with the RN, a secret access code is supplied. As explained on page 67, a single secret access code corresponds to each purchase number in a given RNS. For anyone to verify that an RN is genuinely an IDRN, he or she must first give this access code to the company that can verify the RN.

12) Art's employee enters the secret access code and the result of the BET into the RIG, thereby recording this information and thus the whole transaction.

If a bet is executed as was just described, neither Ed's nor Art's employees can consciously influence the selection of the RN. The RN is really determined by two Random Number Generators, Art's RIG and Ed's RNS. The employees in the BET have no control, nor can they re-do a BET because the BET terms and result are fully recorded.

RNS NOT CONTROLLED BY EITHER PARTY

If the RNS is controlled by a neutral party, then the key to preventing cheating is to insure that the Inputter can only try one input and have no knowledge of what RN the input will result in. The neutral party can physically prevent the Inputter from checking an input. Or, the neutral party can simply insure that only one RN is supplied per bet and record when it is supplied. A record of when the RN is supplied allows both parties (if there are only two) to verify that the RN was supplied after a bet is set and verify what party found out the RN first.

Embodiments

Subscription Payment Where Bet Is Set By Business Reply Card

Illustration

Assume that Sports Illustrated business reply card solicitations include the following offer to potential subscribers.

"Dear potential subscriber, you can make a bet with us in the following way: If we win the bet, you pay $50. Our odds of winning the bet will be 2/5 so that our expected value, and your expected payment, is $20. A number from 1–5 will decide the bet. If the number is "1" or "2", we will win the bet. The number will come from a Magazine Subscription Processors, Inc., a neutral company with no stake in who wins the bet.

They will generate a number for you when they receive this business reply card, indicating that you are willing to enter into a bet with us. If you win, they will not even send you a bill but, if you lose they will send you a bill within 2 weeks of receiving this card.

Magazine Subscription Processors, Inc. will only generate one RN for this purchase after receiving this card. The purchase can be identified by your name and address."

Physically Preventing the Parties (Bettors) From Checking an Input Using Example of a Lottery In a lottery, the bettors are a group betting against each other. The neutral party dispensing the RN's runs the lottery. It prevents the bettors from being physically able to check what RN might result from their inputs (their ticket numbers).

IDRN's Dispensed by an Electronic RNS Not Controlled by Either Party

If Ed is the Inputter, Art tries the input first. The trick is that the independently controlled RNS informs Art if he indeed is the first to have tried the input for that given BET. Again, the BET must always be specified ahead of time. Hence, when Ed provides an input, it includes specific BET information such as the amount of the BET and the parties in the BET. If Art finds that the input has been tried before, he knows that Ed may have found out the RN in advance and hence the RN is nullified. For example, two parties can conduct bets by computers connected to a central computer. The central computer would be the source of the IDRN's. Assume Ed provides the input. Art would then be the first to check the result of this input. The central computer could verify that Art indeed was the first to check that input for that particular bet.

Another method is to have Ed commit to the input at a verified time and then have the time the RN is supplied be verified.

Transferring Expected Payment Risk

Sometimes it is advantageous to make bets for larger amounts than one party in a payment might want to make. For example, McDonalds might want to make bets only for $500 so that fewer total payments would be made. The problem is that most customers would not want to risk $500 on a hamburger. The solution is to transfer the EP risk to a third party.

Let's call our three parties Bill, Ralph and Rob. Bill wants to bet with Ralph for a large sum. Ralph doesn't want to take the risk and transfers the risk to Rob so that Bill is now betting with Rob.

(In addition to the step of executing a fair bet) Transferring EP risk requires the steps of:

providing an assignment that can be used in an EP bet to uniquely specify the bet and prove that a Rob assumes Ralph's EP risk in a that bet;

insuring that once this assignment is used it cannot be re-used;

enabling Rob to collect payment from Ralph for assuming Ralph's risk;

enabling Bill to collect payment from Rob if Rob loses the bet.

Four embodiments will be described.

I) Lottery Tickets

A lottery ticket, if unused, has an expected value and can be used as payment. A lottery ticket satisfies the four steps above because it specifically assigns a given amount of EP risk in a specific bet, a person pays for the ticket and a used ticket cannot be used again and, if a lottery ticket is a winner it indicates that and allows one to cash it with whoever runs the lottery.

A lottery ticket can be turned into a travellers check like instrument, see FIG. 9, by adding a "pay to the order of" line 29.5 and a signature line 29.6. Lottery "checks" would cost less to process because only a fraction would need to be collected on.

(If lottery ticket checks are sent as payment, a neutral party must record their receipt, otherwise the receiver of losing tickets could deny having received them.)

II). Credit Cards

A credit card slip can simply have box which a merchant would check signifying that the merchant was willing to bet for a given amount with the customer's bank (the bank that issued the customer's credit card). The purchase amount on the slip would still have to be charged to the customer through conventional methods but the betting would reduce the number of payments made to the merchant. Alternatively, the merchant's bank, to whom the merchant turns in credit card receipts, could pay off the merchant as in the conventional method and then the merchant's bank could bet with the customer's bank. Again, the customers would be charged the purchase amounts but the banks would reduce the total number of payments made to each other. All four required steps for transferring risk are satisfied. The credit card slip can be used as an assignment of EP risk in a specific bet. The customer is charged for having the EP risk transferred. The banks, as long as the betting is fair, do not allow any redos of bets. And the winners can collect payment.

These credit card examples show that transferring risk can often be thought of not as transferring risk but simply the making of an EV payment between two parties. The customer need not even know that a big bet is going on based on his or her purchase. Still the first party, the customer in this case, must pay so that the second and third parties can carry out their bet. Therefore, when three parties are involved in a payment we can say that the EP risk is being transferred though that label might not always seem appropriate.

III) Electronic Funds Transfer (EFT)

Figure 10:
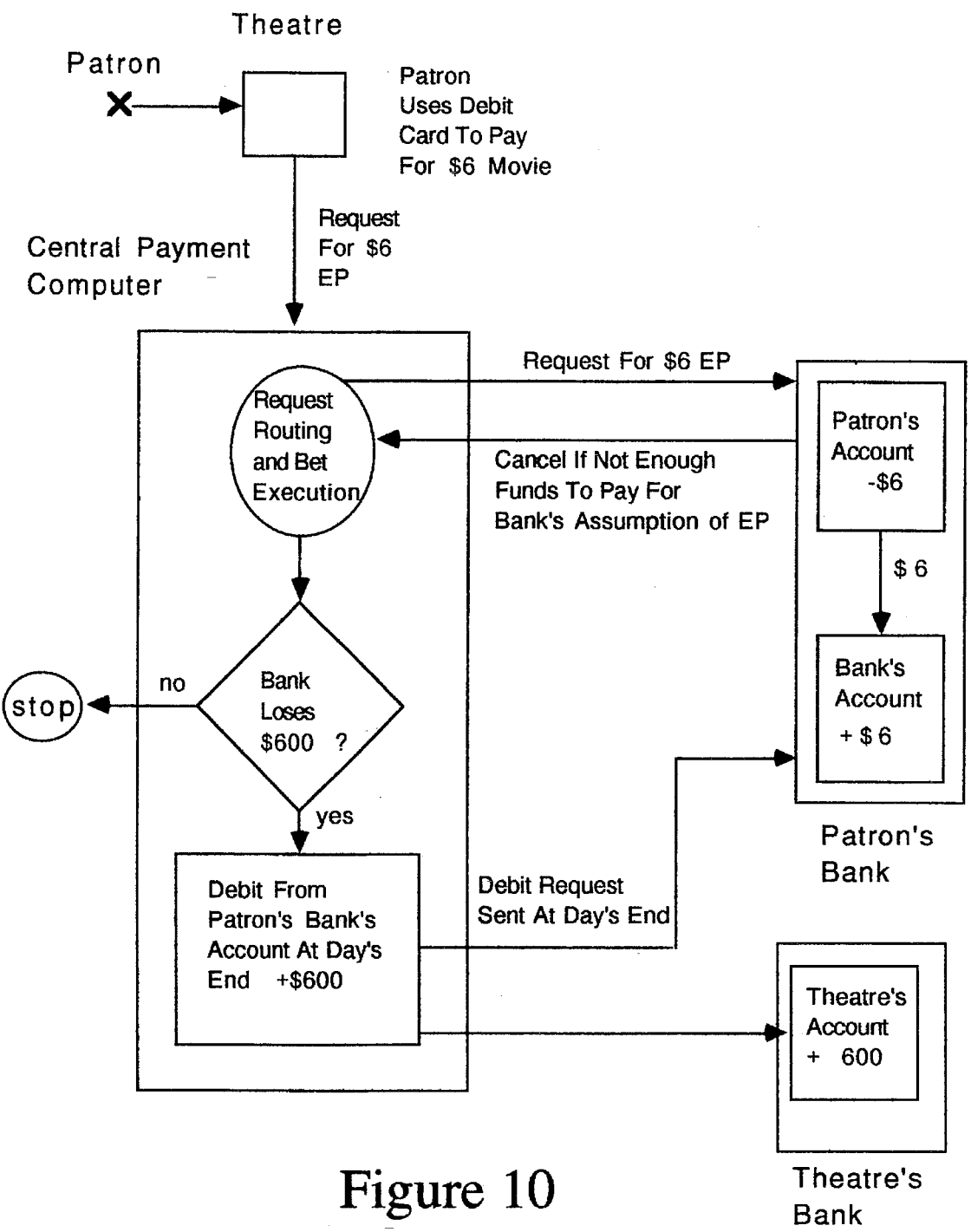
FIG. 10 shows an expected value payment made by electronic funds transfer where betting risk is transferred and the bet is executed by a central computer.

FIG. 10 shows a flow chart of an EFT using an EVPM where the EP risk is transferred to a bank. We are using as an example a patron going to a movie theatre. We assume that the patron's bank accepts that all payments at this theatre are bet with the chances of the theatre winning being 1/100. Bets can be executed by the theatre, by a central computer as in FIG. 10 or by the patron's bank as in FIG. 11.

As in FIG. 10, say that a patron goes to a movie theatre and pays with a debit card. The request for transferring funds from the patron's account to the movie theatre's account would go through a central computer. The patron's bank must get paid by the patron for assuming the patron's EP risk. Hence the central computer routes the request for funds to the patron's bank. The bank transfers $6 from the patron's account to the bank's own account and cancels the bet if the patron does not have the $6. The central computer also executes the bet. If the bank wins, no payment is made to the theatre. If the bank loses, a $600 debit is registered by the central computer and the theatre's bank is notified to credit the theatre $600. At the end of the day, all the debits are totaled and the central computer instructs the patron's bank to debit its own account by that much. (Credits can be batched as well as debits or neither need be batched.)

Figure 11:
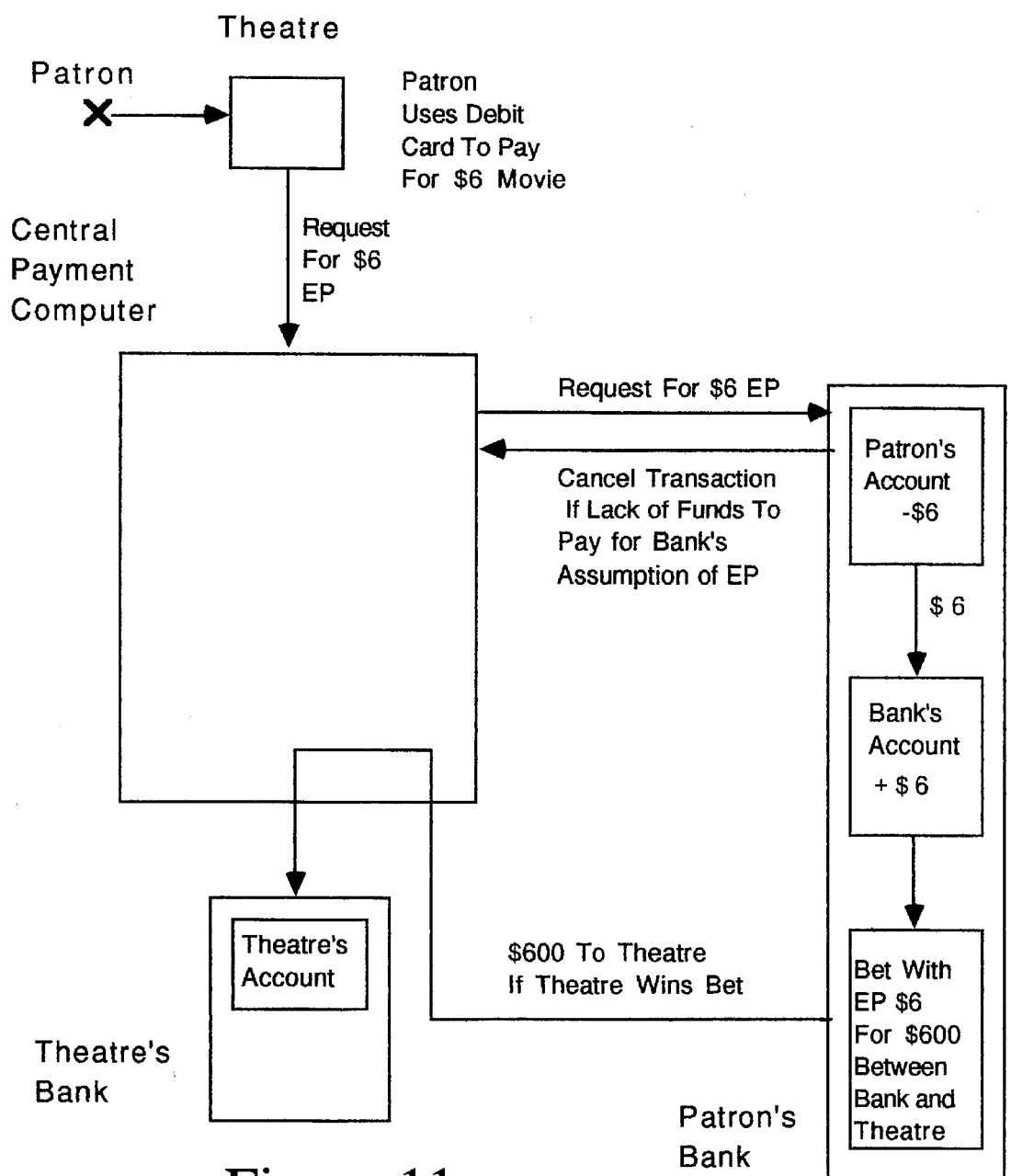
FIG. 11 shows an expected value payment made by electronic funds transfer where betting risk is transferred and the bet is executed by a bank computer.

FIG. 11 shows the same EFT except that the bet is executed by the patron's bank. Upon losing, the patron's bank debits its own account $600 and credits the theatre's account through the central computer.

If the bet is executed at the theatre a request must still be muted to the patron's bank so that $6 can be debitted from the patron's account to pay for the bank's assuming the patron's EP risk. If the theatre wins the bet a request is sent to transfer $600 from the patron's bank's account to the theatre's account. If the theatre loses, no such request is made.

In EFT's, transaction cards along with computers are used to assign EP risk in a specific bet and insure that the assignment is paid for. The computers in the network do the actual debitting and assigning based on information on the transaction cards. The computers in the network also insure that assignments are not reused and that winners collect.

IV) By Pre-paid Debit Cards

A pre-paid debit card is a card that has a monetary value assigned it by the issuer. Upon use, the card itself is debitted a given amount by a card reader. One example is the "copy-cards" used by patrons in libraries to pay for copies.

The pre-paid debit cards can be used to assign EP risk. And, because they are debitted by a certain amount in each purchase, the amount of EP risk being assigned cannot be reused again. Further, the party that buys the card has paid to have the EP risk transferred. Lastly, if the card reader is connected to an EFT network, the winners of bets can collect.

Figure 12:
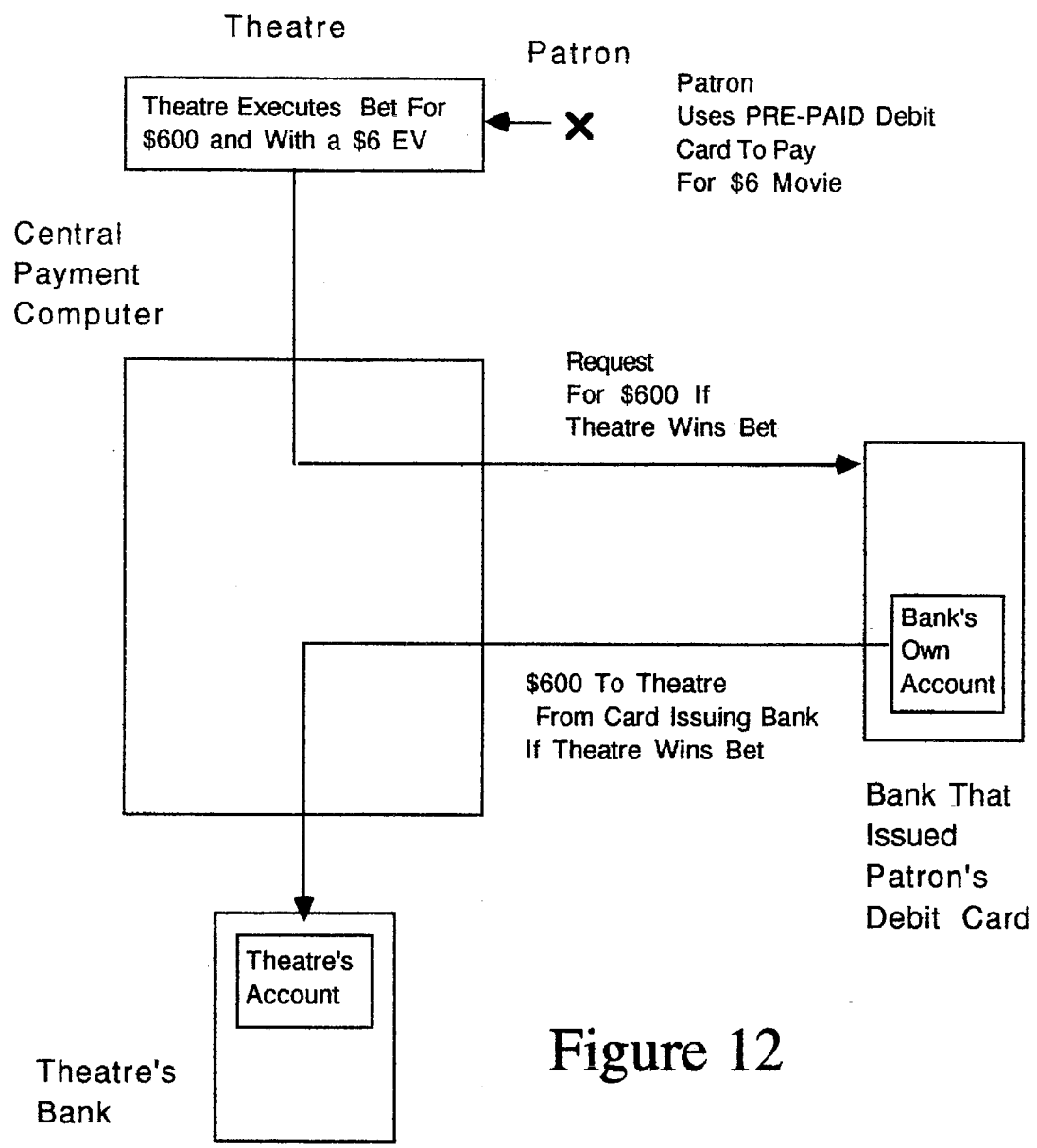
FIG. 12 shows an expected value payment made by electronic funds transfer where betting risk is transferred using pre-paid debit cards.

For example, assume a bank issued such cards. A card could carry information informing the a card reader that payment was for a bet with the bank. Assume also that the card reader, say at a theatre, was connected to a central computer as in the previous illustrations. And assume that the bets are executed at the theatre. See FIG. 12. In this case, the theatre's card reader debits the card $6 and then executes a bet. If the theatre wins, it sends a request through the central computer to transfer $600 from the patron's bank's account to the theatre's account. If the theatre loses, no such request is necessary.

Elements Required in Z's When an EVPM Is Used to Speed Up the Movement of Lines of People Where Payments Are Made Lines of people where payments are made can move more quickly if fewer payments have to be made. An EVPM can accomplish this goal.

There are two types of lines where payments are made, lines where people pay and lines where people receive payment (here "payment" refers to the commodity that is bet for in an exchange if an exchange takes place).

There are two kinds of bets that can be used to speed up the movement of both types of lines. In the first kind, payers bet for a set amount greater than they would ordinarily pay. For instance, if people ordinarily had to pay $1 to a tollbooth, they would bet to possibly pay, say, $20 with the chance of paying being 1/20. In the second kind of bet, payers bet to possibly pay a multiple of what they would ordinarily pay. For instance, in the New Jersey Turnpike, the amount that people have to pay varies with the distance travelled on the turnpike and payment is made upon exiting. At exit tolls people could enter "multiplier" lanes. Here each person would have, say, a 1/20 chance of losing and upon losing would have to pay 20 times the amount originally intended.

In dealing with fines we are really dealing with a group of people who go on to form a line, the group doesn't actually have to be in a line. A group often requires methods and means for managing its flow. Further, a group often requires special methods and means for preventing cheating. The methods and means for managing flow and preventing cheating differ in lines where people make payments and lines where people receive payments. In lines where people receive payments the Z simply requires methods and means for preventing receivers from redoing bets. That simply requires means for recording that a receiver's bet has been executed.

A Z for speeding up the movement of lines where people pay requires the following steps:

Setting the terms of the bet.

Determining the result of the bet for each person.

Signalling to each person whether he or she has won or lost.

Insuring that each person in the group bets with the receiver of the payment.

Preventing losers from exiting without paying.

Collecting payment from losers.

Illustrations

Automatic Toll Plaza

Figure 13:
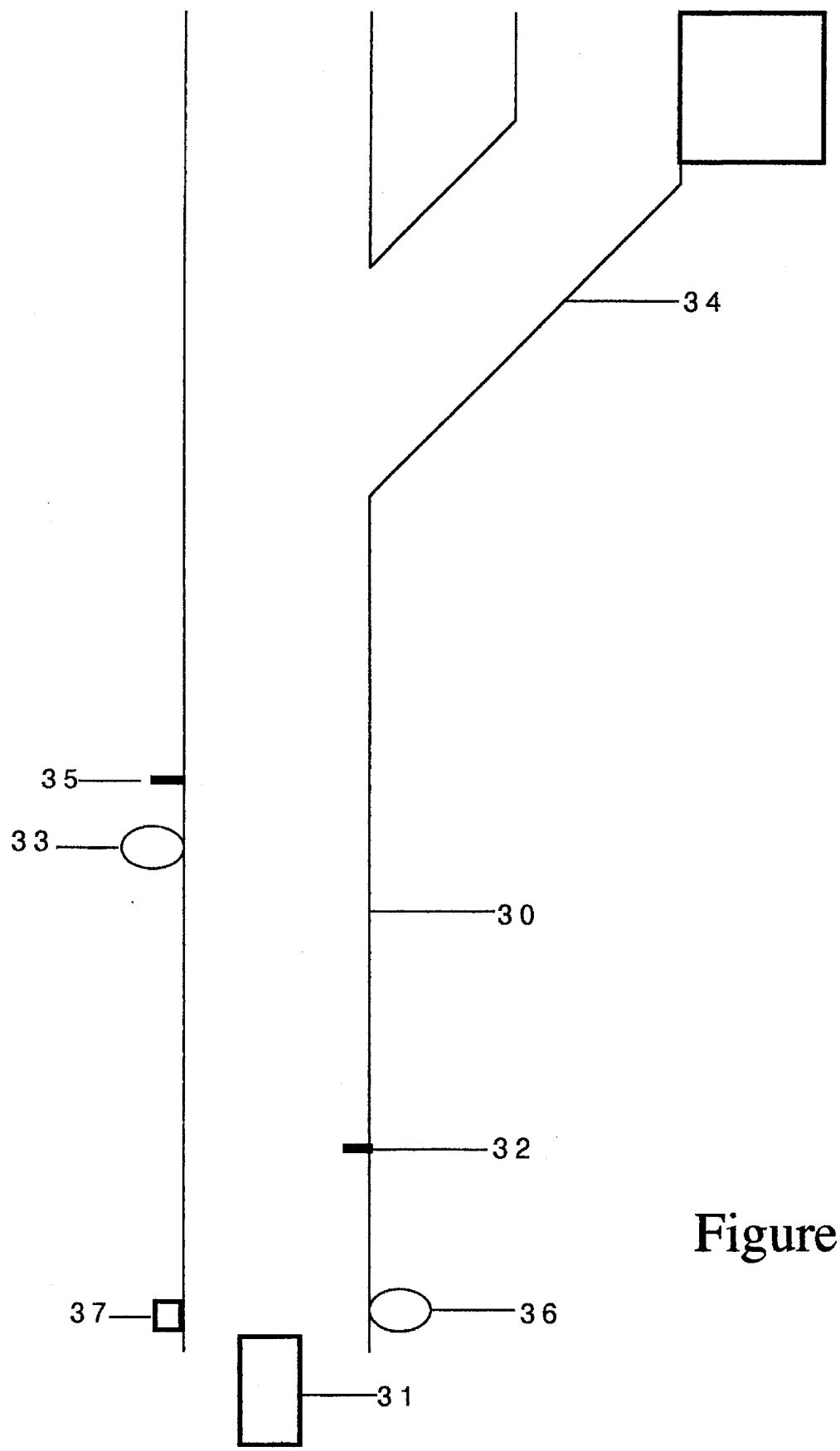
FIG. 13 shows an EVPES incorporated into a toll plaza.

FIG. 13 shows an automatic toll plaza. There is a lane 30 of sixty feet into which cars 31 enter. A car enters the lane and after ten feet, passes a sensor 32 that includes the toll plaza's RNS which immediately decides the bet. If the driver loses, a sign 33, connected to the RNS, lights up signalling the driver that he or she has to drive into the payment lane 34 and pay. When a losing car passes that sign, a sensor 35 signals the sign to turn off. Many means are possible for insuring that the driver does not escape without paying. The means given in this example is simply a sign 36 informing the driver that a police camera 37 is recording his or her actions.

Subway Entry System

Figure 14:
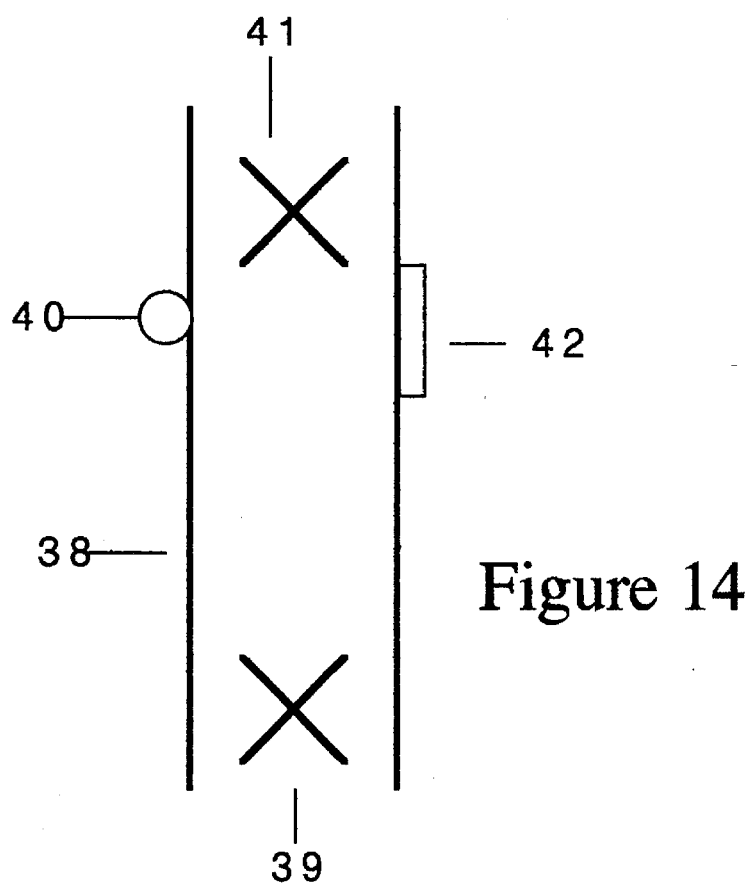
FIG. 14 shows an EVPES incorporated into a subway entry gate.

FIG. 14 shows a subway entry system that has a lane 38 with a turnstile 39 allowing people to enter but not retreat. The system has an RNS connected to this first turnstile so that when a person passes through the turnstile, the RNS decides the bet. The RNS is connected to a sign 40 that signals a win or loss. If a loss, the second turnstile 41 locks and stays locked until a person deposits payment in the payment slot 42.

Movie Line

Figure 15:
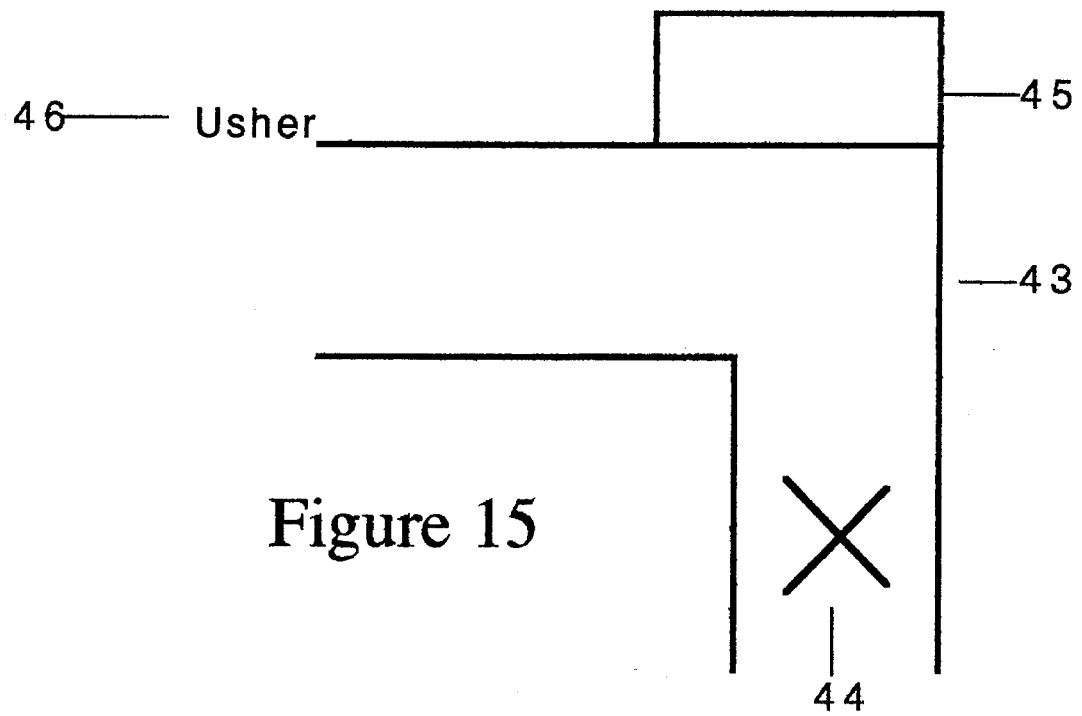
FIG. 15 shows an EVPES incorporated into a movie line.

FIG. 15 shows a movie line that has a lane 43 with that has a turnstile 44 allowing people to enter but not retreat. In the middle of the line is the ticket selling booth where people in line get tickets and bet with the movie theatre. The end of the line which is not physically blocked but has an usher who inspects to see that losers pay and that everyone has actually bet.

Further Discussion of Steps Required For Z's Incorporated into Lines Where People Pay

Setting the Terms

The terms can be pre-set as in the example of the toll or they can be variable as in the movie line example.

Determining the Result for Each Person

The result, the RN, can be supplied in response to individual inputs activated by each person as in the case win all three illustrations. Or the results can be hatched with those of other people as in a lottery.

Signalling To Each Person His or Her Result

The results of bets can be signalled by a visual sign as in the case of the toll road. Results can be communicated in other ways as in a lottery announcement or a bill. The result can also be communicated by a physical barrier as in a toll line with an exit barrier that blocks passage until payment has been made.

Insuring That All Persons Bet

There are two general methods for insuring that all people bet.. The first is to erect physical barriers that channel the flow of people so that they must pass through a station where each person who passes through makes a bet with the receiver. These barriers can block one end, block both ends or there can be no blocks actually just surveillance either by a device such as a camera or by the proper authorities.

If there are no physical barriers, there must be some way to ID everyone in the group (line) individually and trace them so that they can't escape without betting. For example, a cat's license plate could be recorded.

Preventing Losers from Escaping

Losers can be prevented from escaping without paying by the same means used to insure that all persons have bet, namely, physical barriers and surveillance. The only additional means here is that a Z must include means for identifying losers.

Collecting Payment

Collection of payment can take place at the same station that signals the result of the bet or it can be separate. Separating can allow different exits for winners and losers and thereby can speed the flow of line. Separation does not necessarily mean different exits but it does mean that winners are not blocked at the exit by losers who are in the act of paying off.

Also, payment can be collected even later, for example by billing.

It can be collected automatically or manually.

A Z can allow the payer to pay in advance and have the payment kept upon the payer losing and returned upon the payer winning. Or the payer can pay only upon losing.

Blum's Protocol for Cheat Proof Coin Flipping Over the Phone

An RN can be generated and verified using Blum's protocol for cheat proof coin flipping over the phone. The protocol is described in the digest of papers of the IEEE spring compcon82 proceedings, Library of Congress No. 81-86399.

Blum's protocol can, of course, be useful when parties cannot see each other. To fully prevent cheating, the terms of a bet must be set before the RN is revealed and further, they may have to be recorded if agents are handling the bet. Recording would include recording the execution of Blum's protocol.

Farecard Machine Application

An EVPM can be usefully applied to farecard machines, such as those used in the District of Columbia metro system. The gates that accept the cards and deduct fares often leave the cards with an amount that is below the minimum cost of a fare. A patron is required to go to an "addfare" machine to put more money on the card. Instead, the gates can be equipped with an EVPES that executes an automatic bet when the card is below a certain amount. The patron then receives either no card, in which case she has lost the bet, or a card with a value equal to or greater than the minimum value of a trip on the metro. This use of an EVPM should be covered by the original EVPM patent, however, just in case it is not, the use is pointed out here.

Mixing Function

In many situations, it will be useful to have one RN decide multiple bets, as for instance happens with the lottery. However, a problem here is that the payment stream may be quite "lumpy." A business, for example, might win or lose all bets on one day.

(As usual we assume the two parties are Ed and Art, Ed being the business and Art being the customer.) To even out the flow of revenue, the EVPES can include a function that adds a given number to the RN, based on some predetermined algorithm that Ed and Art agree upon. For example, the added number can be tied to Art's customer identification number. The point here is not so much the anti-cheating aspects but that an extra number is added to (or otherwise combined with) the original RN, in order to smooth out Ed's revenue stream. A different number can be added for each bet.

A single RN applied to multiple bets can be very useful for it allows there to be a recognized source of RN's for bets. Thus there can be a national RN used for bets across the nation. For example, a data-base company might have thousands of charges for a given day. The national RN for that day is applied to all those charges, with a mixing function that adds an extra number for each customer bet. The customers know there has been no cheating because the national RN is controlled by some central source and the terms of the bets have all been set before the RN for that day is revealed. The mixing function as well has been agreed upon beforehand. The mixing function is included in the EVPES.

Two Combined Inputs Embodiments

One method of insuring a fair RN is to use a combiner as described in the section on combined inputs. In that section, a method was described in which Ed generates his input on a non-electronic medium. The medium is shown to Art but the input itself is hidden. Two useful embodiments of this method are detailed below.

1. Ed's input can be generated on the transaction tape of, for example, a cash register. The tape is the type that includes two tapes, a top and a bottom. The bottom is the carbon that is normally used as a copy for a customer. The trick is that Ed's input is imprinted without ink on the top tape. The impression is made on the carbon which registers the input. The input is covered by the top tape but evidence that it has already been set is on the carbon.

The tape can be fed out a bit and a mark made on both tapes. The mark can be made visible with ink (though the mark is not essential). The mark would be in plain view of Art. Art enters his input after the mark is visible. Art's input is combined with Ed's on the tape in a position after the mark and Ed's input. When the transaction is finished, and the tape is fed out of the register, Art can see from the sequence on the tape of input, mark, and combined input that Ed's input was set before Art revealed his own input.

Figure 16:
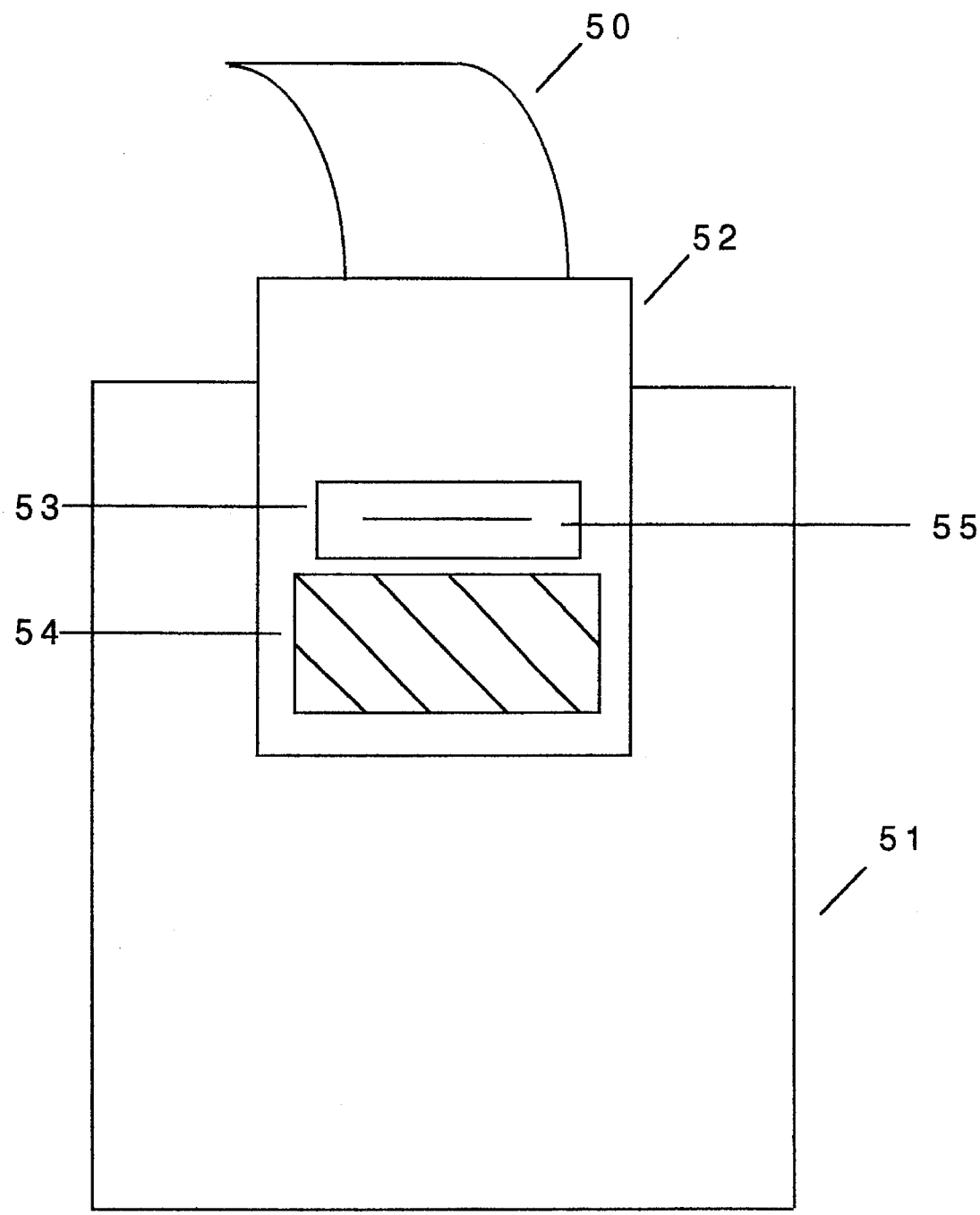
FIG. 16 shows an anti-cheating system for an EVPES that combines inputs.

2. Another embodiment of the basic method is shown in FIG. 16. The transaction tape 50 on, say, a cash register 51 is concealed by an opaque cover 52. The cover has a clear area 53 through which the tape can be seen. The cover also includes a retractable part 54 that slides over the clear part to totally obscure the tape. The retractable part slides over the clear area when the register record's Ed's input on the tape. The printing of Ed's input is hidden by the cover. After the input is recorded, the tape is fed out a bit and a mark 55 is made on the tape. The tape is then fed out so that the mark coincides with the clear area. The retractable part is then slid back so that Art can see the mark. Meanwhile, the input is blocked from view by the opaque part of the cover. Art then enters his input which is combined with Ed's. The tape is then fed out and Art can see that Ed's input was set before the mark was made. Art is satisfied because he saw the mark through the clear part. As in the case above, the mark is not necessary. Art can be assured of when Ed's input was made by the length of the tape from the clear part of the cover to the end of the cover where the tape comes out. A mark simply makes detection of the distance easier.

Method of Insuring Fair RN's

An elegant way to insure that an RN is fair is to let the party that does not control the RNS hedge the bet. In this method, a third party is necessary. The method is as follows:

We assume as usual that Ed controls the RNS and Art is betting with Ed. Dix is the third party.

Ed executes the bet and transmits the result, including the RN, to Dix. Ed and Dix keep the result secret from Art.

Then Art is given the option of making an additional bet where An takes Ed's side of the bet. The same RN applies to both of Art's bets. The original one and the second one. (Art can be allowed to bet a larger amount than he risked in his original bet.

After Art decides to hedge his bet or not, the result is revealed by Ed. An can verify the result with Dix. The result of the bet must be transmitted to Dix before Art hedges. Otherwise, Ed, seeing Art hedge, can make the RN fair or can even make the bet more unfair.

Such a method can be incorporated into an EVPES whereby:

1. Ed and Art enter into a bet which is set by the EVPES.
2. Ed controls the EVPES.
3. Ed transmits the result to a neutral, third party who records it but keeps the result secret from Art for a period of time. The bet includes an identification number.
4. Art has the option of betting more money on Ed's side of the bet. This hedging of the bet can be accomplished by letting Art access his bet by the initial bet ID number and by entering a simple command like HEDGE. The EVPES includes means for registering and recording the command as well as calculating the results of the hedge.
5. Ed transmits the result of the bet to the third party before Art signifies his desire to hedge.

(The same system can allow Art to make an additional bet on the same side as the original bet. Thus Art can make the secondary, hedge bet on either side of the original bet. A further variation is for Dix to make bets with Ed based on the bets that Art checks. This method need not be detailed here at this time except to say that Dix can insure the fairness of Ed's RN's by betting on either side of the Ed-Art bets.)

Probabalistic Sorter of Customer Demand

One inherent aspect of an open market is that businesses usually must set a single price for a product or service whereas ideally they would set different prices according to the demand curves of individual customers. But as people's minds can't be read and as the market is open (meaning it is impractical to set up secret price negotiations with individual customers) businesses usually cannot price discriminate as much as they would like.

Yet in many businesses, particularly those with low variable costs, such as information businesses and certain capital intensive businesses, it would be quite advantageous to be able to price discriminate. Of course, businesses do the best they can. For example, airlines have different prices depending on when a person buys a ticket. Such attempts can be improved on. The question is twofold. One, how to sort customer demand curves to judge whether one customer is willing to pay more than another? And two, how to prevent customers who are willing to pay a higher price from taking advantage of a lower price?

The method outlined below does not purport to answer these questions well, only to give a poor, partial solution but one, nevertheless, that can have significant impact on certain industries.

A random number generator can be used to sort customers according to whether they will pay a price x, called the "full price" or a price that is lower, y, called the "discounted price." Customers are sorted by probability, by the uncertainty of receiving a commodity. It is assumed that customers who would pay full price need the commodity and would not tolerate the uncertainty of only possibly receiving the it.

There are two versions of this method. In one, the customer pays a certain price for the chance to win the commodity. The expected price is the discounted price. In this version, the business and customer engage in a bet. This version has been described previously.

In the other version, the customer pays nothing up front but pays only if he or she is picked randomly to be able to buy at the discounted price. If the customer wins, then he or she pays the discounted price.

In both versions, the probability of a customer winning is set precisely. A customer signs up for the chance to win.

Now the problem with this method is that customers will try to enter the random selection process more times than they are allowed, thereby increasing the probability of winning above the level set by the business. To stop this from happening, the business main defense is to record customer identification information. Better yet, the business should have a way to verify the information.

A second problem is that full payers will try to get the discounted prices. To stop this problem, a business might prevent customers who sign up for the discount from also buying at full price.

A more practical method is to use probability along with time. The idea here is to make the customer uncertain as to when the commodity can be purchased. It is assumed that the customer who will pay full price will not tolerate an uncertain delay. A business can set the period T and then let potential customers have a random chance of buying the product or service at the discounted price after that period. A person can have a probability of getting the discount at a certain date or the date itself can be random.

It is also possible to make it probabalistically near certain (or even certain) that a person will win the fight to buy at a discount but to make the date random, thereby creating the necessary uncertainty.

A business can even let customers set (request) the price levels they would buy at if the customers "won" the random number generation.

As the betting version of the probabalistic son was previously described in an example, the non-betting version is shown in an example below.

Say a person is interested in a flight from New York to Los Angeles. Say the full price is $500. And say the person is only willing to pay $200. The airline might give this potential customer, say, a 1/4 chance to buy the ticket at $200 at an unspecified time. The person would register for this offer. The registration would include the person's identification and the date of registration. The airline would wait a period of time and then pick a date or dates on which to give this person a random chance of buying the ticket at $200.

The airline would use such customers to fill planes. Thus if a flight from NY to LA was 2/3's full, the airline could check its list of "random buyers" and pick some randomly to win the discounted seats.

The winners would get discounted tickets while the airlines would get extra revenue above variable costs while not losing full payers.

A probabalistic sorter includes at minimum an RNS and may include: means for registering customer identification information, for setting time periods when a customer is eligible to win, for setting the chances of winning, for operating the RNS to determine whether customer has won, for setting the expected price, and for recording how many times a customer has engaged in the random selection process.

Two ways the system can be operated are described below.

1. A probabalistic method and system of sorting customers can include the steps of:

a. setting the probability that a customer will be able to buy a commodity at a certain price,
 b. recording the customer's identification information,
 c. operating a random number generator to determine whether the customer has won the right to buy the commodity at said price,
  c1. said random number generator selecting an integer from 1–N,
  c2. said probability being set at X/N where X is an integer,
  c3. if the integer selected is less than or equal to X then the customer wins,
  c4. if not, the customer loses,
 d. recording that the customer has engaged in said random selection process.

2. A probabalistic method and system of sorting customers can include the steps of:

a. setting the probability that a customer will be able to buy a commodity at a certain price,
 b. recording the customer's identification information,
 c. dividing a period of time, T, into N units and operating a random number generator with integer values from 1–N,
 d. awarding the customer the right to buy the commodity during the unit selected by the random number generator,
 e. recording that the customer has engaged in said random selection process.

I claim:

1. A probabilistic method and system for sorting customers that includes a random number generator and means for registering customer identification information, for setting time periods when a customer is eligible to win, for setting the chances of winning, for operating the random number generator to determine whether customer has won, and for recording how many times a customer has engaged in the random selection process;

said method and system also comprising the following steps:
 a. using said probability setting means to set a probability that a customer will be able to buy a commodity at a certain price, said probability represented by a fraction X/N, less than 1, where X and N are positive integers,
 b. using said registration means to record a customer's identification information,
 c. operating said random number generator to determine whether said customer has won the right to buy the commodity at said price, said random number generator selecting an integer from 1–N,
  c1. if the integer selected is less than or equal to X then the customer wins,
  c2. if not, the customer does not win,
 d. using said registration means to record that said customer has engaged in said random selection process.

2. A probabilistic method and system for sorting customers that includes a random number generator and means for registering customer identification information, for setting time periods when a customer is eligible to win, for setting the chances of winning, for operating the random number generator to determine whether customer has won, and for recording how many times a customer has engaged in the random selection process;

said method and system also comprising the following steps:
 a. using said probability setting means to set a probability that a customer will be able to buy a commodity at a certain price, said probability represented by a fraction X/N, less than 1, where X and N are positive integers,
b. using said registration means to record a customer's identification information,
c. using said time setting means to divide a period of time, T, into N units, where N is an integer, and operating said random number generator, said random number generator selecting an integer from 1–N,
d. awarding said customer the right to buy the commodity during the unit selected by the random number generator,
e. using said registration means to record that said customer has engaged in said random selection process.

* * * * *